(12) United States Patent
Liu et al.

(10) Patent No.: US 11,781,926 B1
(45) Date of Patent: Oct. 10, 2023

(54) FIBER GRATING SENSOR, STRAIN MONITORING METHOD AND SYSTEM FOR A SURROUNDING ROCK OF A DEEP ROADWAY

(71) Applicant: Institute of Rock and Soil Mechanics, Chinese Academy of Sciences, Wuhan (CN)

(72) Inventors: Bin Liu, Wuhan (CN); Yongshui Kang, Wuhan (CN); Yuanguang Zhu, Wuhan (CN); Xuewei Liu, Wuhan (CN); Sheng Wang, Wuhan (CN); Zhi Geng, Wuhan (CN)

(73) Assignee: Institute of Rock and Soil Mechanics, Chinese Academy of Sciences, Wuhan (CN)

( * ) Notice: Subject to any disclaimer, the term of this patent is extended or adjusted under 35 U.S.C. 154(b) by 8 days.

(21) Appl. No.: 18/183,974

(22) Filed: Mar. 15, 2023

(30) Foreign Application Priority Data

Mar. 15, 2022 (CN) .......................... 202210249220.2

(51) Int. Cl.
*G01L 1/24* (2006.01)
(52) U.S. Cl.
CPC .................................... *G01L 1/246* (2013.01)
(58) Field of Classification Search
CPC ....................................................... G01L 1/246
See application file for complete search history.

(56) References Cited

U.S. PATENT DOCUMENTS

| 7,418,171 B2 * | 8/2008 | Grattan | ................... G01L 1/242 |
| | | | 374/E11.016 |
| 7,689,087 B2 * | 3/2010 | Mihailov | ........... G02B 6/02114 |
| | | | 385/124 |

(Continued)

FOREIGN PATENT DOCUMENTS

| CN | 1400451 A | * | 3/2003 |
| CN | 106840013 A | | 6/2017 |

(Continued)

OTHER PUBLICATIONS

Title of the Item: Rock and Soil Mechanics Publication Date: Oct. 31, 2011 Name of the Author: Liu Quan-Sheng et al. Article Title: Research on supporting method for deep rock roadway with broken and soft surrounding rock in Guqiao Coal Mine pp. 3097-3104.

(Continued)

*Primary Examiner* — Octavia Davis Hollington
(74) *Attorney, Agent, or Firm* — Nitin Kaushik

(57) ABSTRACT

The present application provides an optical fibre grating sensor and a strain monitoring method and system for a surrounding rock of a deep roadway, which are used for monitoring deformation of the surrounding rock of the deep roadway and are provided with a weak optical fibre grating array large-range strain sensor, which can accurately monitor the strain of the surrounding rock of the deep roadway. The optical fibre grating sensor comprises an optical fibre, the optical fibre comprises an optical fibre core and a plurality of optical fibre gratings inscribed on the optical fibre core, the optical fibre grating is a weak optical fibre grating with a peak reflectivity lower than 1%, and the plurality of optical fibre gratings perform unit discretization on the whole piece of the optical fibre so as to realize quasi-distributed sensing.

2 Claims, 5 Drawing Sheets

(56) References Cited

U.S. PATENT DOCUMENTS

| | | | |
|---|---|---|---|
| 11,022,717 B2* | 6/2021 | Ohanian, III | G01L 1/243 |
| 2023/0120870 A1* | 4/2023 | Liu | G01N 29/4436 |
| | | | 73/598 |
| 2023/0131570 A1* | 4/2023 | Lu | G06F 30/13 |
| | | | 703/2 |

FOREIGN PATENT DOCUMENTS

| | | | | |
|---|---|---|---|---|
| CN | 107356356 A | * | 11/2017 | |
| CN | 209945269 U | | 1/2020 | |
| CN | 210513242 U | | 5/2020 | |
| CN | 112461151 A | | 3/2021 | |
| CN | 214497610 U | * | 10/2021 | E02D 33/00 |
| CN | 113898410 A | * | 1/2022 | |
| EP | 3894796 B1 | * | 5/2022 | G01B 11/14 |

OTHER PUBLICATIONS

Title of the Item: Journal of Nanjing University of Science and Technology Publication Date: May 8, 2019 Name of the Author: Wang Ruoling et al. Article Title: Study on matched grating demodulation of weak strain fiber grating sensor pp. P224-P229.

* cited by examiner

FIBER GRATING SENSOR, STRAIN MONITORING METHOD AND SYSTEM FOR A SURROUNDING ROCK OF A DEEP ROADWAY

CROSS-REFERENCE TO RELATED APPLICATIONS

The application claims priority to Chinese patent application No. 202210249220.2, filed on Mar. 15, 2022, the entire contents of which are incorporated herein by reference.

TECHNICAL FIELD

The present application relates to the field of coal mining, and particularly relates to an optical fibre grating sensor and a strain monitoring method and system for a surrounding rock of a deep roadway.

BACKGROUND

At present and for a long time in the future, coal is still the main energy in China. Well mining is the main method of deep coal resources mining, it is necessary to excavate a large number of down-hole tunnels, and the surrounding rock stress adjustment is generated after the tunnel excavation. If the concentrated stress exceeds the strength of the surrounding rock, the surrounding rock near the surface of the tunnel will be destroyed first, and will gradually expand to the deep until the three-dimensional stress balance is reached at a certain depth. At this time the surrounding rock has been transformed into a broken state.

Under the influence of the three-high-one-disturbance, the deformation process of the surrounding rock mass in the deep roadway is more complex than that in the shallow roadway, showing significant nonlinear soft rock mechanical characteristics, presenting a series of engineering problems such as non-continuity, non-coordination large deformation, large-scale instability and failure. Therefore, taking appropriate support measures to ensure the stability of the surrounding rock is the necessary premise of construction safety and production in deep coal mine roadway.

The important prerequisite for the stability control of the surrounding rock is the accurate judgment of the deformation degree of surrounding rock. Through the accurate judgment of the deformation degree of surrounding rock, it can provide an important basis for the best construction time of different supporting methods, such as anchor rod, anchor cable, grouting and so on. In order to achieve the best supporting effect, the corresponding supporting methods should be adopted when the fracture zone of the surrounding rock develops to different degrees.

However, in the research process of the existing related technology, the inventor found that the deformation monitoring method for the surrounding rock of the deep roadway in the coal mine currently used cannot monitor the deformation process of the surrounding rock well due to the complicated operation of the monitoring method itself, the high cost of the monitoring equipment and the application range, that is to say, the monitoring accuracy of the surrounding rock of the deep roadway in the coal mine is not high.

SUMMARY

The present application provides an optical fibre grating sensor and a strain monitoring method and system for a surrounding rock of a deep roadway, which are used for monitoring the deformation of the surrounding rock of the deep roadway and are provided with a weak optical fibre grating array large-range strain sensor, which can accurately monitor the strain of the surrounding rock of the deep roadway, so as to provide a strong data basis for the stability control of the surrounding rock.

In a first aspect, the present application provides an optical fibre grating sensor, wherein the optical fibre grating sensor comprises an optical fibre, the optical fibre comprising an optical fibre core and a plurality of optical fibre gratings inscribed on the optical fibre core, the optical fibre grating being a weak optical fibre grating with a peak reflectivity of less than 1%, and the plurality of optical fibre gratings performing unit discretization on a whole piece of the optical fibre so as to realize quasi-distributed sensing;

in the working process, when the incident light enters the sensing network composed of the optical fibre gratings and a reflection phenomenon occurs, a part of the optical wave having a wavelength satisfying the Bragg grating condition being reflected back, the remaining optical wave continuing to be transmitted to the next grating along the optical fibre core, and the sensing function of the optical fibre sensing network being realized through multiple reflections inside the optical fibre and demodulation of the reflected light.

In conjunction with the first aspect of the present application, in a first possible implementation method of the first aspect of the present application, after the optical fibre grating sensor is embedded in the surrounding rock of the deep roadway, in the working process, the strain value of the surrounding rock of the deep roadway is measured according to the following formula: $\Delta\lambda_b = K_E \varepsilon$, $\Delta\lambda_b$ being an increment value of a central wavelength $\lambda_b$, the central wavelength $\lambda_b$ being changed due to change of a refractive index $n_{eff}$ of the fibre core by the strain of the surrounding rock of the deep roadway, $K_\varepsilon$ being a strain sensitivity coefficient measured in advance by the optical fibre grating sensor, $\varepsilon$ being an optical fibre strain value, and $\varepsilon$ being taken as the strain value of the surrounding rock of the deep roadway;

After the fiber grating sensor is embedded in the surrounding rock of the deep roadway, in the working process, the temperature change value of the surrounding rock of the deep roadway is measured according to the following formula: $\Delta\lambda_b = K_T \Delta T$, $\Delta\lambda_b$ being an increment value of the central wavelength $\lambda_b$, and the central wavelength $\lambda_b$ being changed due to the change of the refractive index $n_{eff}$ of the fibre core by the temperature of the surrounding rock of the deep roadway, $K_T$ being a temperature sensitivity coefficient measured in advance by the optical fibre grating sensor, $\Delta T$ being the temperature change value of the optical fibre, and $\Delta T$ being the temperature change value of the surrounding rock of the deep roadway.

In conjunction with the first possible implementation of the first aspect of the present application, in the second possible implementation of the first aspect of the present application, the optical fibre grating sensor further comprises a coating layer of an outer layer of the optical fibre, wherein the coating layer is made of a polymer material mainly comprising a polymer material so as to improve a stretching strength of the optical fibre and reduce scattered light interference, and the polymer material comprises an epoxy resin.

In a second aspect, the present application provides a strain monitoring method for a surrounding rock of a deep roadway, comprising:

a monitoring system acquiring a first type of sensing data acquired by a first type of optical fibre grating sensor embedded in the surrounding rock of a deep roadway, the first type of optical fibre grating sensor comprising an optical fibre, the optical fibre comprising an optical fibre core and a plurality of optical fibre gratings inscribed on the optical fibre core, the optical fibre grating being a weak optical fibre grating with a peak reflectivity of less than 1%, and the plurality of optical fibre gratings performing unit discretization on a whole piece of the optical fibre so as to realize quasi-distributed sensing; in the working process, when the incident light enters the sensing network composed of the optical fibre gratings and a reflection phenomenon occurs, a part of the optical wave having a wavelength satisfying the Bragg grating condition being reflected back, the remaining optical wave continuing to be transmitted to the next grating along the optical fibre core, and the sensing function of the optical fibre sensing network being realized through multiple reflections inside the optical fibre and demodulation of the reflected light;

the monitoring system determining a strain value of the surrounding rock of the deep roadway corresponding to the sensing data by combining a conversion relationship between the first type of sensing data collected by the first type of optical fibre grating sensor and the strain value of the surrounding rock of the deep roadway;

the monitoring system generating a strain monitoring result of the surrounding rock of the deep roadway based on the determined strain values at different time periods.

In combination with the second aspect of the present application, in the first possible implementation method of the second aspect of the present application, the monitoring system determining a strain value of the surrounding rock of the deep roadway corresponding to the first type of sensing data by combining a conversion relationship between the first type of sensing data collected by the first type of optical fibre grating sensor and the strain value of the surrounding rock of the deep roadway comprising:

the monitoring system measuring the strain value of the surrounding rock of the deep roadway according to the following formula:

$$\Delta\lambda_b = K_\varepsilon \varepsilon,$$

$\Delta\lambda_b$ being an increment value of a central wavelength $\lambda_b$, the central wavelength $\lambda_b$ being changed due to change of a refractive index $n_{eff}$ of the fibre core by the strain of the surrounding rock of the deep roadway, $K_\varepsilon$ being a strain sensitivity coefficient measured in advance by the optical fibre grating sensor, $\varepsilon$ being an optical fibre strain value, and $\varepsilon$ being taken as the strain value of the surrounding rock of the deep roadway.

In conjunction with the second aspect of the present application, in a second possible implementation of the second aspect of the present application, after the monitoring system generates a strain monitoring result of the surrounding rock of the deep roadway based on the determined strain values at different time periods, the method further comprises:

the monitoring system determining a target roadway surrounding rock deformation range corresponding to the strain value according to a matching relationship between a pre-set strain value and a roadway surrounding rock deformation range, the roadway surrounding rock deformation range comprising three ranges in total, namely, an elastic region, a damage expansion region and a fracture expansion region.

In conjunction with the second possible implementation method of the second aspect of the present application, in the third possible implementation method of the second aspect of the present application, after the monitoring system determining a target roadway surrounding rock deformation range corresponding to the strain value according to a matching relationship between a pre-set strain value and a roadway surrounding rock deformation range, the method further comprises:

when the target roadway surrounding rock deformation range is a fracture expansion region, the monitoring system determines a reinforcement solution for a secondary support intervention according to development of the fracture expansion region, the reinforcement solution comprising the following contents:

the range of fracture expansion region <1 m, corresponding to stable surrounding rock, maintaining the original support structure, without secondary support;

the range of fracture expansion region being 1 m-2 m, corresponding to relatively stable surrounding rock, applying pre-stressed anchor rod support;

the range of the fracture expansion region being 2 m-3 m, corresponding to general stable surrounding rock, applying pre-stressed anchor rod support and shallow hole grouting;

the range of the fracture expansion region being 3 m-4 m, corresponding to general unstable surrounding rock, applying pre-stressed anchor rod support, anchor cable support and deep hole grouting;

the range of the fracture expansion region ≥4 m, corresponding to unstable surrounding rock, applying pre-stressed anchor rod support, anchor cable support, deep hole grouting and shed support.

In conjunction with the third possible implementation method of the second aspect of the present application, in the fourth possible implementation method of the second aspect of the present application, if the range of the fracture expansion region ≥4 m, the method further comprising, before applying the pre-stressed anchor rod support, anchor cable support, deep hole grouting and shed support:

acquiring second type of sensing data acquired by a second type of optical fibre grating sensor embedded in the surrounding rock of a deep roadway, the second type of optical fibre grating sensor comprising an optical fibre, the optical fibre comprising an optical fibre core and a plurality of optical fibre gratings inscribed on the optical fibre core, the optical fibre grating being a weak optical fibre grating with a peak reflectivity lower than 1%, and the plurality of optical fibre gratings performing unit discretization on the whole piece of the optical fibre so as to realize quasi-distributed sensing; in the working process, when the incident light enters the sensing network composed of the optical fibre gratings and a reflection phenomenon occurs, a part of the optical wave having a wavelength satisfying the Bragg grating condition being reflected back, and the remaining optical wave continuing to be transmitted to the next grating along the optical fibre core, and the sensing function of the optical fibre sensing network being realized through multiple reflections inside the optical fibre and demodulation of the reflected light;

the monitoring system performing secondary verification on the target roadway surrounding rock with the deformation range being the fracture expansion region according to the second type of sensing data;

if verified range of the fracture expansion region after the second verification ≥4 m, applying the pre-stressed anchor rod support, anchor cable support, deep hole grouting and shed support;

if the verified range of the fracture expansion region after the second inspection is 3 m-4 m, obtaining a standard range of the fracture expansion region according to the range of the fracture expansion region and the verified range of the fracture expansion region, the standard range of the fracture expansion region being obtained by taking an average value from the sum of the range of the fracture expansion region and the verified range of the fracture expansion region; when the standard range of fracture expansion region is 3 m-4 m, then applying the pre-stressed anchor rod support, anchor cable support and deep hole grouting; when the standard range of the fracture expansion region ≥4 m, applying the pre-stressed anchor rod support, anchor cable support, deep hole grouting and shed support.

In conjunction with the fourth possible implementation method of the second aspect of the present application, in the fifth possible implementation method of the second aspect of the present application, the stability coefficient V1 corresponding to the stable surrounding rock is marked as 1.0 when the range of fracture expansion region <1 m; the stability coefficient V2 corresponding to the relatively stable surrounding rock is marked as 2.0 when the range of fracture expansion region is 1 m-2 m; the stability coefficient V3 corresponding to the general stable surrounding rock is marked as 3.0 when the range of fracture expansion region is 2 m-3 m; the stability coefficient V4 corresponding to the general unstable surrounding rock is marked as 4.0 when the range of fracture expansion region is 3 m-4 m, and the stability coefficient V5 corresponding to unstable surrounding rock is marked as 5.0 when the range of fracture expansion region ≥4 m;

the method further comprises:

acquiring a difference value of the stability coefficient of the target roadway surrounding rock at the previous moment and the current moment, the V being equal to $V_{currrent}$ minus $V_{previous}$, and the $V_{previous}$ and/or $V_{current}$ being any numerical value of the V1, V2, V3, V4 and V5;

if V is less than or equal to 0, determining to be a safety zone, and maintaining the original support structure, with no secondary support;

if V is equal to 1, determining to be a normal evolution region, and performing a reinforcement solution according to a current range of the fracture expansion region; and if V is greater than or equal to 2, determining to be an abnormal evolution region, and performing a reinforcement solution according to the range of the fracture expansion region ≥4 m.

In a third aspect, the present application provides a strain monitoring system for a surrounding rock of a deep roadway, wherein the strain monitoring system for a surrounding rock of a deep roadway comprises an optical fibre grating sensor, and the strain monitoring system for a surrounding rock of a deep roadway is used for performing the method provided in the second aspect of the present application or any one of the possible implementations provided in the second aspect of the present application.

In a fourth aspect, the present application provides a computer-readable storage medium having stored thereon a plurality of instructions adapted to be loaded by a processor to perform the method provided by the second aspect of the present application or any one of the possible implementations of the second aspect of the present application.

It can be seen from the above that the present application has the following beneficial effects.

With regard to the deformation monitoring of the surrounding rock of a deep roadway, the present application configures a weak optical fibre grating array large-range strain sensor, wherein the sensor comprises an optical fibre, and the optical fibre comprises an optical fibre core and a plurality of optical fibre gratings inscribed on the optical fibre core; the optical fibre grating is a weak optical fibre grating with a peak reflectivity of less than 1%; and the plurality of optical fibre gratings perform unit discretization on the whole piece of the optical fibre to realize quasi-distributed sensing. In the working process, since the optical fibre grating is a weak optical fibre grating with a peak reflectivity of less than 1%, and the grating length of the weak optical fibre grating is shorter than that of a common optical fibre grating. Therefore, when the incident light enters the sensing network composed of the optical fiber gratings and the reflection phenomenon occurs, a part of the optical wave having a wavelength satisfying the Bragg grating condition will be reflected back, and the remaining optical wave will continue to transmit to the next grating along the optical fiber core. Through multiple reflections inside the optical fiber and demodulation of the reflected light, the sensing function of the optical fiber sensing network is realized, so that the strain of the surrounding rock of the deep roadway can be accurately monitored, which can provide a strong data basis for the stability control of the surrounding rock.

DETAILED DESCRIPTION OF THE EMBODIMENTS

The embodiments of the present disclosure will now be described more fully hereinafter with reference to the accompanying drawings, in which some, but not all embodiments of the disclosure are shown.

Under the requirement of deformation monitoring of a surrounding rock of a deep roadway, the existing monitoring technology cannot monitor the deformation process of the surrounding rock well, which leads to poor monitoring accuracy and low practicality. In the present application, a weak reflection Bragg fiber grating sensing technology sensor with a low grating reflectivity is configured to implement deformation monitoring of the surrounding rock of a deep roadway.

Figure 1:
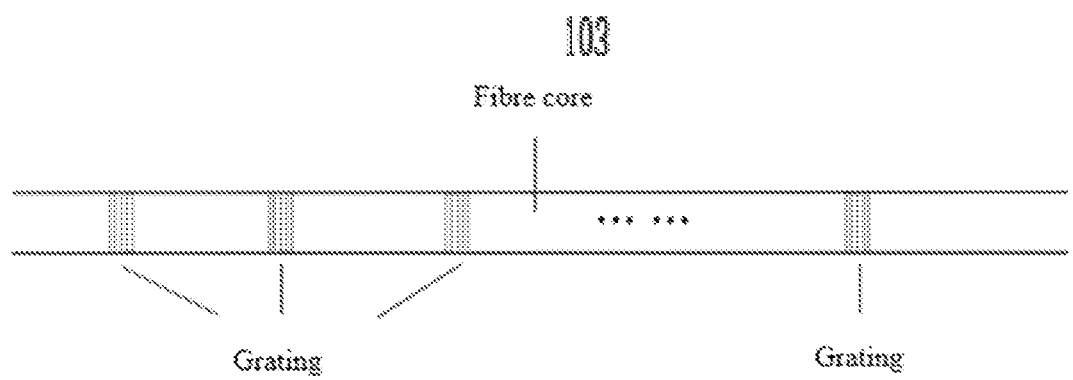
FIG. 1 is a schematic diagram of a structure of an optical fibre core of the present application.

Specifically, the present application adopts the concept of using a grating as a basic sensing unit, and accomplishes unit discretization on the whole piece of the optical fibre through the combination of several gratings so as to realize quasi-distributed sensing. Therefore, the core structure of the sensor is an optical fibre core in which a grating is inscribed, as shown in a schematic structural diagram of an optical fibre core of the present application shown in FIG. 1. In addition, compared with wavelength division multiplexing, space division multiplexing and frequency division multiplexing sensing technologies, in order to obtain a greater sensing range, the weak reflection grating inscribed inside the optical fibre of the present application can also be connected in series with the time division multiplexing sensing technology, and the sensing capacity of the sensing network is greatly increased by the low reflection of the spectrum and the time interval of the reflected spectrum.

With regard to the deformation monitoring of the surrounding rock of a deep roadway, the present application configures a weak optical fibre grating array large-range strain sensor, wherein the sensor comprises an optical fibre, and the optical fibre comprises an optical fibre core and a plurality of optical fibre gratings inscribed on the optical fibre core. The optical fibre grating is a weak optical fibre grating with a peak reflectivity of less than 1%; and the plurality of optical fibre gratings perform unit discretization on the whole piece of the optical fibre to realize quasi-distributed sensing. In the working process, since the optical fibre grating is a weak optical fibre grating with a peak reflectivity of less than 1%, and the grating length of the weak optical fibre grating is shorter than that of a common optical fibre grating, when the incident light enters the sensing network composed of optical fiber gratings and the reflection phenomenon occurs, a part of the optical wave having a length satisfying the Bragg grating condition will be reflected back, and the remaining optical wave will continue to transmit to the next grating along the optical fiber core. Through multiple reflections inside the optical fiber and demodulation of the reflected light, the sensing function of the optical fiber sensing network is realized, so that the strain of the surrounding rock of the deep roadway can be accurately monitored, which can provide a strong data basis for the stability control of the surrounding rock.

After completing the inscription of the fiber core, a cladding layer needs to be added to the outside of the core. When an incident light wave enters an optical fiber and satisfies certain conditions, a total reflection phenomenon occurs between the core and the cladding, so that the incident light continues to travel along the optical fiber.

At the same time, in order to ensure the stability of light transmission in optical fiber, a coating layer mainly composed of epoxy resin and other polymer materials can be added outside the cladding layer, which can effectively improve the stretching strength of optical fiber and reduce the interference of scattered light.

Figure 2:
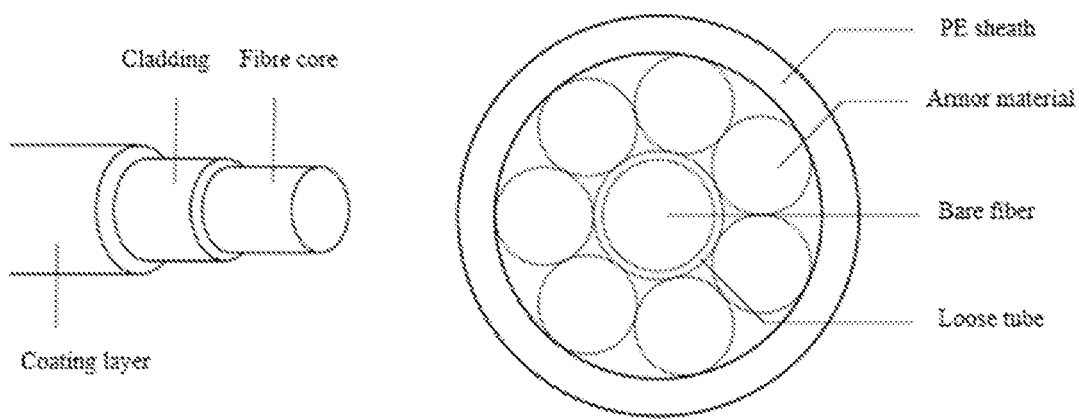
FIG. 2 is a schematic diagram of a structure of an optical fibre grating sensor of the present application.

In particular, it can be understood with reference to a schematic structural diagram of the fiber grating sensor of the present application shown in FIG. 2.

In order to protect the application of sensor in practical engineering from the external environment, multi-level protection layer can also be provided to achieve physical protection. The outermost protective layer is a PE sheath to protect the internal structure from environmental factors. The middle layer is armoured material, which can effectively improve the mechanical properties of the sensor and greatly increase the stretching strength of the optical fiber, and through the deformation of multiple fixed points in the armoured layer, strain is generated at the two ends of the grating. The inner layer is a loose sleeve that adds a layer of protection to the bare fiber and transmits external strain.

Furthermore, it can be understood that with regard to the optical fibre grating sensor provided in the present application, the sensing principle thereof is specifically to change the change of the output sensing data according to the deformation condition of the surrounding rock of the deep tunnel in which the sensor is embedded, so as to sense the strain as a strain sensor, and due to the arrangement of the weak reflection thereof, a corresponding strain condition can be sensed more accurately and in a large range.

However, in a specific induction process, as a specific implementation, it is known from the optical fibre coupling theory that when the phase matching condition is satisfied, the Bragg wavelength equation of the optical fibre grating is:

$$\lambda_b = 2n_{eff}\Lambda \tag{1}$$

where $\lambda_b$ is a central wavelength, $n_{eff}$ is a refractive index of the core, and $\Lambda$ is a grating period.

The increment is in the form of:

$$\Delta\lambda_b = 2\Delta n_{eff}\Lambda + 2n_{eff}\Delta\Lambda \tag{2}$$

where $\Delta\lambda_b$ is change of the central wavelength, $\Delta\Lambda$ is change of the grating period, and $\Delta n_{eff}$ is change of the refractive index of the core.

It can be seen from formula (2) that changing the grating period and the refractive index of the fiber core shifts the central wavelength of the grating, and the refractive index of the fiber core and the grating period will change under the influence of parameters such as temperature and strain, which is the principle of realizing the sensing function of the optical fiber grating.

It can be seen from formulas (1) and (2) that the condition requirement for the grating to have a diffraction phenomenon is that when the Bragg grating is affected, both the grating period and the refractive index thereof will be changed, thereby causing the central wavelength of the reflected light wave to shift, i.e.

$$\frac{\Delta\lambda_b}{\lambda_b} = \frac{\Delta\Lambda}{\Lambda} + \frac{\Delta n_{eff}}{n_{eff}} \tag{3}$$

When other external conditions, such as temperature and the like, are unchanged, and the optical fiber grating is influenced by the strain generated by stress, the mechanical stretching of the optical fiber as a whole will change the grating period inside the optical fiber. On the other hand, when stress is applied in the direction perpendicular to the incident light wave, elasto-optical effect is generated to make the refractive index of the fiber core; therefore, the change caused by the axial stretching of the optical fiber as a whole can be expressed as:

$$\frac{\Delta\Lambda}{\Lambda} = \varepsilon \tag{4}$$

The elasto-optical effect can be expressed as:

$$\frac{\Delta n_{eff}}{n_{eff}} = -\frac{1}{2}n^2[(1-\mu)P_{12} - \mu P_{11}]\varepsilon \tag{5}$$

Where $\varepsilon$ is the fiber strain value, $$P_e = \frac{1}{2}n^2[(1-\mu)P_{12} - \mu P_{11}] \tag{6}$$

where $P_{11}$ and $P_{12}$ are the elasto-optical coefficients of the fiber, i.e. the coefficients of change of longitudinal and transverse refractive indices of the grating, $P_e$ is an effective elasto-optical coefficient of the fiber, and p is the Poisson's ratio.

Equation (3) can therefore be rewritten as:

$$\frac{\Delta\lambda_b}{\lambda_b} = (1 - P_e)\varepsilon \tag{7}$$

Equation (7) is the relationship between the wavelength change and strain of the fiber grating. When the material of fiber core is constant, the strain sensing coefficient of fiber grating is a constant theoretically, which can be calculated by strain sensing calibration experiment.

$$K_\varepsilon = (1-P_e)\lambda_b \quad (8)$$

where $K_\varepsilon$ is the strain sensitivity coefficient of the fiber Bragg grating sensor.
Then:

$$\Delta\lambda_b = K_\varepsilon \varepsilon \quad (9)$$

Equation (9) is a more intuitive relationship between central wavelength change and strain.

In addition, it can be understood that, based on the formula (9), the specific strain value ($\varepsilon$) of the surrounding rock can be calculated by the coefficient of the relevant optical fibre material, and the strain sensitivity coefficient of different optical fibre gratings will have corresponding differences due to the different materials of the optical fibre gratings, the technical differences in grating writing and the influence of environmental factors in the packaging of the optical fibre sensor. Therefore, after the internal packaging of the optical fibre grating sensor is completed, an indoor sensor test is performed to calibrate the optical fibre Bragg grating sensor, and the strain sensitivity coefficient of the sensor can be determined.

In addition, the fiber grating sensor provided in the present application can sense temperature in addition to strain.

As another specific implementation, the fiber grating will change the grating period due to thermal expansion and contraction under the influence of temperature, while the refractive index of the core changes due to the thermo-optic effect under the condition that other external conditions are unchanged.

However, the change of grating period caused by thermal expansion and contraction can be expressed as:

$$\frac{\Delta\Lambda}{\Lambda} = \alpha\Delta T \quad (10)$$

where $\alpha$ is the coefficient of thermal expansion and $\Delta T$ is the temperature change value of the optical fibre.

The change in refractive index of the core due to the thermo-optic effect can be expressed as:

$$\frac{\Delta n_{eff}}{n_{eff}} = \xi\Delta T \quad (11)$$

where $\xi$ is the thermo-optic coefficient of the optical fiber material and represents the relationship between the refractive index of the optical fiber and temperature.

Equation (3) can then be rewritten as:

$$\frac{\Delta\lambda_b}{\lambda_b} = (\alpha + \xi)\Delta T \quad (12)$$

Equation (12) is a relationship between temperature change and wavelength change of a fiber Bragg grating. When the material of fiber core is constant, the thermal expansion coefficient and thermo-optic coefficient are constant, and the temperature and wavelength change are of a linear relationship. By demodulating the amount of central wavelength shift, the temperature change can be determined.

Making:

$$K_T = (\alpha+\xi)\lambda_b \quad (13)$$

where $K_T$ is the temperature sensing coefficient of the fibre Bragg grating.
Then:

$$\Delta\lambda_b = K_T\Delta T \quad (14)$$

Equation (14) is a more intuitive relationship between wavelength change and temperature.

It can be understood that, based on the equation (14), the specific temperature change value ($\Delta T$) of the surrounding rock can be calculated by the coefficient of the relevant optical fiber material, and the temperature sensitivity coefficients of different optical fiber gratings will have corresponding differences due to the different materials of optical fiber gratings, the technical differences of grating writing and the influence of environmental factors when the optical fiber sensors are packaged. Therefore, the temperature sensitivity coefficient of the fiber Bragg grating sensor can be determined by calibrating the fiber Bragg grating sensor through indoor sensor test after the fiber Bragg grating sensor is encapsulated.

However, in the research and development process of the optical fibre grating sensor provided in the present application, the calibration and test processing performed thereon may also be involved. By way of example, the specific contents thereof may be as follows:

In the research and development of optical fiber sensor, the performance test of sensor is an important part, which is divided into sensitivity calibration experiment and stability experiment. The sensitivity calibration experiment is mainly to obtain the relationship parameters of sensor wavelength and environmental physical quantities such as strain and temperature, and the stability experiment is mainly to investigate whether the sensor performance meets the expected requirements through experiments.

In the following, through the calibration experiment of strain sensitivity and temperature sensitivity of the sensor, indicators such as the sensitivity coefficient, basic error and linearity of the sensor are calculated to evaluate the performance of the optical fiber sensor.

After the completion of the experiment, the calculated parameter indicators are summarized and compared with the parameter indicator range and allowable error specified in the national linear displacement sensor specification "JJG860-2011", so as to complete the operational performance qualification of optical fiber sensor. The relevant specific accuracy level and allowable error in the specification are shown in Table 1 below.

TABLE 1

Metering characteristics of displacement sensors

| Item | Technical index |
| --- | --- |
| Basic error (%) | ±2.5 |
| Linearity (%) | ±2.0 |
| Return Error (%) | 1.0 |
| Repeatability (%) | 0.5 |

(1) Full-Scale Output Value

The full-scale output value refers to the algebraic difference between the maximum output value and the minimum output value of the measurement range of the optical fiber grating sensor under the specified conditions. This indicator represents the output range of the optical fiber grating sensor under the normal working state, and is also the basis for the calculation of other parameter indicators. The specific calculation method for the full-scale output value YFS is shown in the following formula (15):

$$Y_{FS} = \frac{\sum_{k=1}^{n}(Y_{imax} - Y_{imin})}{n} \quad (15)$$

where n is a number of cycles, $Y_{imax}$ is a maximum wavelength value of the i-th cycle, and $Y_{imin}$ is a minimum wavelength value of the i-th cycle.

(2) Basic Error

The basic error δ is one of the important indexes for evaluating the working performance of the calibrated instrument, which refers to the error existing in the sensor itself under the condition of no influence of any environmental factors. i.e. under the condition of full stretching, and is an index for the sensing accuracy of the optical fiber sensor. The data of the basic error must be recorded experimentally under the condition that various external environmental conditions remain unchanged, so as to exclude the influence of accidental error. The specific calculation formula is shown in the following formula (16):

$$\delta = \left| \frac{y_{i,j} - Y_i}{Y_{FS}} \right|_{max} \times 100\% \quad (16)$$

where $Y_i$ is a wavelength value of the fitted curve of the i-th point and $y_{ij}$ refers to the wavelength value of the i-th point in the j-th stroke.

(3) Linearity the linearity I is also referred to as linearity error, which refers to the deviation degree of the wavelength value on the experimental curve point and the corresponding point on the fitted curve during the calibration experiment of the optical fiber grating sensor, and reflects the linearity degree of the calibration characteristic curve of the grating within the experimental range. The specific calculation formula is shown in the following formula (17):

$$l = \left| \frac{\bar{y}_i - Y_i}{Y_{FS}} \right|_{max} \times 100\% \quad (17)$$

where $\bar{y}_i$ is an average of forward and reverse stroke outputs of three cycles of the fiber optic sensor at the i-th calibration point.

(4) Return Error

The return error h refers to the difference between the calibration characteristics of the optical fiber sensor in the forward and reverse process of the stretching test under the same experimental environment, also called the hysteresis error. It represents the difference of output wavelength indications of fiber grating located at the same calibration point. When the forward and reverse paths of a cycle of the optical fiber sensor reach the calibration point, there is a significant difference in the feedback wavelength values, which indicates that there is a problem in the adaptability between the components inside the sensor, and the design criteria in the development stage are not met.

The specific calculation method of return error is shown in the following equation (18):

$$h = \left| \frac{|\bar{g}_i - \bar{b}_i|}{Y_{FS}} \right|_{max} \times 100\% \quad (18)$$

where $\bar{g}_i$ is an average value of the output wavelengths of three cycles of forward stroke of the sensor at the i-th calibration point, and $\bar{b}_i$ is an average value of the output wavelengths of three cycles of reverse stroke of the sensor at the i-th calibration point.

(5) Repeatability

Repeatability refers to the degree of inconsistency in the output values obtained by multiple forward and reverse stroke measurements of the optical fiber sensor during the whole calibration experiment. In the process of multiple cycle experiments, multiple times of wavelength indicating value data will be recorded and read at each calibration point.

The specific calculation formula is shown in Equation (19) below:

$$r = \frac{0.61\Delta}{Y_{FS}} \times 100\% \quad (19)$$

where Δ is the maximum difference between each other in the stroke of the same direction.

(6) Sensitivity

Sensitivity is an indicator of sensing characteristics. It reflects the degree of wavelength change of the fiber grating under the action of environmental physical quantity. Taking the forward stroke and reverse stroke as one measurement cycle, according to the measurement results of three cycles, the least squares method is used to calculate the reference straight line formula, which is represented by the following formula (20):

$$Y_{FS} = Y_0 + KL_i \quad (20)$$

where K is the sensitivity coefficient of the sensor and $L_i$ is the ratio of the displacement value to the basic length of the sensor.

Strain Sensitivity Coefficient Calibration and Test (1) Strain Sensitivity Calibration Experiment The method for calibrating the strain sensitivity coefficient of the optical fiber grating is to fix two ends of the optical fiber grating, one end is fixed on the desktop, and the other end is fixed on the displacement stretching platform, so that the optical fiber grating is subjected to axial uniform strain, and the strain of the whole section of optical fiber represents the strain of the grating.

The accuracy of the displacement stretching platform is 0.01 mm. The distance between the fixed ends of the two fiber clights is 1 m, and 1 m length of fiber drawing 1 mm corresponds to 1000με of fiber.

The displacement platform is moved by 0.1 mm per interval from the initial position, the central wavelengths of the optical fiber Bragg grating are respectively read and recorded on the optical fiber demodulator, the stretching range is designed from 0 to 10 mm for the experiment, and three groups of cyclic stretching are performed. The specific experimental data are shown in Table 2 below:

TABLE 2

FBG strain experimental data

| Displacement (mm) | Strain (με) | Wavelength (nm) | | | | | |
|---|---|---|---|---|---|---|---|
| | | First group of cycles | | Second group of cycles | | Third group of cycles | |
| | | Stretching | Contracton | Stretching | Contraction | Stretching | Contraction |
| 0 | 0 | 1556.0214 | 1555.9801 | 1555.9854 | 1555.9534 | 1555.9580 | 1555.9371 |
| 1.0 | 1000 | 1557.2607 | 1557.2231 | 1557.2190 | 1557.1935 | 1557.1952 | 1557.1601 |
| 2.0 | 2000 | 1558.5003 | 1558.4625 | 1558.4586 | 1558.4257 | 1558.4206 | 1558.3995 |
| 3.0 | 3000 | 1559.7083 | 1559.6759 | 1559.6629 | 1559.6365 | 1559.6276 | 1559.6039 |
| 4.0 | 4000 | 1560.9335 | 1560.9086 | 1560.8812 | 1560.8633 | 1560.8678 | 1560.8466 |
| 5.0 | 5000 | 1562.1723 | 1562.1383 | 1562.1141 | 1562.0871 | 1562.0696 | 1562.0283 |
| 6.0 | 6000 | 1563.4055 | 1563.3819 | 1563.3613 | 1563.3377 | 1563.3148 | 1563.3009 |
| 7.0 | 7000 | 1564.6460 | 1564.6261 | 1564.6083 | 1564.5851 | 1564.5603 | 1564.5481 |
| 8.0 | 8000 | 1565.8480 | 1565.8367 | 1565.8104 | 1565.7941 | 1565.7703 | 1565.7617 |
| 9.0 | 9000 | 1567.0821 | 1567.0740 | 1567.0591 | 1567.0507 | 1567.0261 | 1567.0207 |
| 10.0 | 10000 | 1568.3786 | 1568.3286 | 1568.2945 | 1568.2945 | 1568.2678 | 1568.2678 |

(1) The experimental data shown in Table 2 were analyzed and processed to obtain strain calibration experimental wavelength-strain curves.

The fitted curve equation is:

$$y=1230.1x+1555.9692$$

According to the equation, the strain sensitivity coefficient is 1.23 pm/με.

(2) Strain Measurement Range Test

Due to the lower reflectivity of the weak fiber grating, the weak fiber grating can receive more reflection spectrum than a general fiber grating, so a larger strain measurement range can be obtained.

The strain range test of the weak reflection fiber grating sensor also uses the displacement stretching platform to carry out the stretching test of a large range of strain, and in order to realize the demodulation of the wavelength data generated by the large range of strain stretching, the data acquisition equipment uses a large-capacity ultra-weak grating analyzer.

The central wavelength range of the acceptable reflection spectrum by the equipment is 1528 nm-568 nm, the spatial resolution of the grating array is 1 m, and the system is stable, which meets the requirements of the test. The displacement platform was moved 0.2 mm apart from the initial position, and the central wavelength of the fiber Bragg grating on the fiber demodulator was respectively read and recorded.

When the central wavelength shift caused by stretching exceeds the accepted boundary of equipment, the peak map fluctuates greatly and the center peak is not visible. The central wavelength data of the grating can still be collected, but the strain is non-linear with the wavelength change.

When the central wavelength shift of fiber grating produced by stretching is within the range acceptable by the wavelength of the equipment, the peak diagram fluctuation is small, the data is relatively stable, and the center peak is clearly visible. The central wavelength data of the grating is collected normally, and there is a linear relationship between strain and wavelength change.

When the central wavelength shift of the fiber Bragg grating produced by stretching is close to the accepted boundary by equipment, the fluctuation is larger, but the center peak is clearly visible. The central wavelength data of the grating is collected normally, and there is a linear relationship between strain and wavelength change.

Due to the limited wavelength range accepted by the test equipment, the central wavelength change data obtained from the stretching experiment within its normal range is linear with strain. When the central wavelength generated by stretching is displaced outside the acceptance range of the equipment, the collected data fluctuates greatly and irregularly, so normal experiments cannot be performed.

The specific experimental data for the strain range stretching experiments are shown in Table 3 below:

TABLE 3

FBG experimental data

| Displacement (mm) | Strain (με) | Wavelength (nm) |
|---|---|---|
| 0 | 0 | 1530.2496 |
| 2.0 | 2000 | 1532.6579 |
| 4.0 | 4000 | 1535.0692 |
| 6.0 | 6000 | 1537.4320 |
| 8.0 | 8000 | 1539.8440 |
| 10.0 | 10000 | 1542.2454 |
| 12.0 | 12000 | 1544.6881 |
| 14.0 | 14000 | 1547.0855 |
| 16.0 | 16000 | 1549.5112 |
| 18.0 | 18000 | 1551.9661 |
| 20.0 | 20000 | 1554.3804 |
| 22.0 | 22000 | 1556.7708 |
| 24.0 | 24000 | 1559.3079 |
| 26.0 | 26000 | 1561.7213 |
| 28.0 | 28000 | 1564.1844 |
| 30.0 | 30000 | 1566.6097 |

Data analysis and processing were performed on the experimental data shown in Table 3 to obtain curves.

The one-dimensional linear regression equation for sensor fitting is:

$$y=1224.4x+1530.2496.$$

The square of the correlation coefficient of the linear regression equation is 0.999.

According to the experimental data, the data measured by the weak reflection fiber Bragg grating is more reliable in the wavelength range test of the high-capacity fiber Bragg grating demodulator, and the square of the correlation coefficient of the linear regression equation calculated by the correlation coefficient test method is 0.999, which indicates that the weak reflection fiber Bragg grating changes linearly in the normal test range, and the experimental results show that the maximum measured value of strain of the weak reflection fiber Bragg grating can reach 3% in the limited test range.

Based on the above-mentioned parameter index calculation formula, the data in Tables 2 and 3 and relevant graphs are calculated. Each calibration index of sensor can be obtained as shown in Table 4 below, and it is determined according to Table 1 that the sensing performance of sensor meets the specification.

TABLE 4

Sensor calibration parameters

| | Sensing characteristic | | | Measurement error | | | |
|---|---|---|---|---|---|---|---|
| Index | Maximum strain measurement | Full-scale output $Y_{FS}$ (nm) | Strain sensitivity $K_T$ (pm/με) | Basic error δ | Return error h | Linearity l | Repeatability r |
| Numerical value | 3% | 12.32 | 1.23 | −0.74% | 0.26% | −0.44% | 0.28% |

By calculating the calibration parameters of the sensor and comparing same with the parameter requirements in the linear displacement sensor specification, it can be concluded that the weak reflection optical fiber grating sensor has better working performance, and can complete the requirements of the sensor in the strain testing task in scientific research and practical engineering.

(3) Temperature Sensitivity Coefficient Calibration

The specific method for measuring the temperature sensitivity coefficient of the optical fiber grating sensor is to put a section of the optical fiber grating with the external protective layer removed into a temperature adjustment box, adjust the temperature in the temperature adjustment box at fixed time intervals by means of a control system, record the wavelength value in a section of the room after the temperature is stabilized and take the average value, and repeat the operation for many times until the experiment is completed. The sensitivity parameters are calculated by analyzing the experimental data after the experiment is completed.

Before the start of the experiment, it is necessary to fix the grating and thermometer on a perforated paper box, and then fix the paper box on an iron frame of the temperature adjustment box, so as to prevent the optical fiber from sliding due to wind blowing in the temperature adjustment box through the fixation of optical fiber grating, resulting in the occurrence of strain wavelength interference. After the test object is fixed, one end of the fiber Bragg grating is passed out of the temperature adjustment box and connected to a large-capacity weak fiber Bragg grating demodulator, and the temperature experiment is carried out.

In this calibration experiment, 9 temperature points for high and low temperatures are set, the experiment is started at 10° C. and the temperature of the temperature adjustment box is adjusted at 100 intervals. After each temperature node is stable for about 60 minutes, the wavelength value within the corresponding time is recorded, and the average value is taken. The measured wavelength data in the experiment is shown in Table 5 below:

TABLE 5

FBG temperature experimental data

| | Wavelength (nm) | | | |
|---|---|---|---|---|
| Temperature (° C.) | 1# | 2# | 3# | 4# |
| 10 | 1550.3007 | 1550.3614 | 1550.5297 | 1550.4747 |
| 20 | 1550.4113 | 1550.4782 | 1550.6434 | 1550.5914 |
| 30 | 1550.5201 | 1550.5815 | 1550.7498 | 1550.7005 |
| 40 | 1550.6227 | 1550.6876 | 1550.8545 | 1550.8007 |
| 50 | 1550.7315 | 1550.7947 | 1550.9615 | 1550.9084 |
| 60 | 1550.8341 | 1550.9015 | 1551.0697 | 1551.0131 |
| 70 | 1550.9431 | 1551.0116 | 1551.1752 | 1551.1237 |
| 80 | 1551.0514 | 1551.1237 | 1551.2853 | 1551.2364 |
| 90 | 1551.1657 | 1551.2342 | 1551.3967 | 1551.3472 |

According to the above-mentioned temperature experimental data, the wavelength and temperature change fiber of fiber grating are analyzed, and the fitted curve of wavelength and temperature is obtained by drawing the graph through the relevant software.

The equation for the temperature-wavelength fitted curve is:

$$y=10.78x+1530.3112$$

Based on the above-mentioned fitted curve equation, it can be concluded that the temperature sensitivity coefficient of the weak fiber grating is 10.78 pm/° C., and the square of the correlation coefficient of the linear regression equation calculated by the correlation coefficient test method is 0.999, which also indicates that there is a good linear relationship between the change of the central wavelength of the sensor and the change of the ambient temperature. The specific value of the change of the ambient temperature can be used to exclude the wavelength signal interference on the strain testing at the sensor field.

On the basis of the above-mentioned optical fibre grating sensor provided in the present application, the present application also constructs a strain monitoring system for the surrounding rock of a deep roadway, and based on the optical fibre grating sensor, the deformation of the surrounding rock of the deep roadway in the field is accurately monitored.

In practical applications, the strain monitoring system may comprise, in addition to the optical fibre grating sensor proposed in the present application, a data transmission line built by different devices and devices for data aggregation and data analysis.

Illustratively, in practical applications, the strain monitoring system (surrounding rock deformation monitoring system) has the following design principles:

1. Safety Principle

Safety is the most basic principle in coal mine roadway engineering. The hardware part of the monitoring system should be installed in the roadway and the surrounding rock of the roadway, so the site conditions under the coal mine should be taken into account, especially with gas outburst, rock burst and other coal and rock dynamic disasters. Compared with the traditional sensors, the fiber Bragg grating sensors have an prominent characteristics of electromagnetic interference tolerance ability and electrical insulation. Therefore, the surrounding rock deformation detection system based on fiber grating sensing technology can be safely applied to the harsh engineering environment with high gas content. At the same time, in the installation process of strain optical cable, correct and safe construction can ensure the normal operation of monitoring system.

2. Stability Principle

In the requirements of the monitoring system, the optical fiber demodulator and strain optical cable in the hardware part need to be arranged in the roadway and surrounding rock for a long time, while in the harsh environment of coal roadway, when the engineering disturbance such as tunneling, blasting occurs, the hardware system and software system in the monitoring system need to ensure the normal operation, especially the working stability of strain optical cable and demodulator and the transmission, reading and analysis of transmission optical cable and software system.

3. Economic Principle

Under the condition of ensuring that the monitoring system can operate normally for a long time, the installation process of the fiber grating sensor is simplified, and the layout of the transmission optical cable is reasonably planned by fully investigating the installation site of the monitoring system. However, when the connection fittings between the fiber grating demodulator and the transmission optical cable are selected, it is necessary to ensure that the cost is reasonable and the performance is excessive. The accurate acquisition of the deformation and strain data of the surrounding rock, while a higher cost-performance ratio of the monitoring system is achieved, such that the entire monitoring system can meet the economic principles.

4. Practical Principle

During the installation of the monitoring system in the coal mine, the installation solution should be selected according to the complex and changeable site conditions of the surrounding rock in the coal mine. At the same time, the implementability of the strain optical cable, especially the installation of the hardware part, should be fully considered. In the case of ensuring that the monitoring system normally realizes the monitoring function, the convenience of the software system and the maintenance of the monitoring instruments should be strengthened, the complexity of the operation of the monitoring system should be reduced, and the redundant and useless steps should be reduced. At the same time, the design of the software system should ensure the convenience of use, visual display and other characteristics. The early warning value of surrounding rock deformation is through a software port, method decisions can be quickly made and support means can be provided during warning, which can truly ensure that the monitoring system has a high practicality.

5. Principle of Advancement

The monitoring system should be advanced in the selection, design and development of hardware equipment and software system. Specifically, under the premise that the monitoring system can be used safely and reliably, the hardware development and selection can use new and safe industrial products such as fiber Bragg grating and fiber long-period grating. The grating wavelength demodulation equipment can also adopt advanced overseas demodulators or components for secondary processing. The software part shall consider the network management in practical engineering, such that the software version and function can be updated in real time, and the situation that the monitoring system is unable to be used in practical engineering due to software problems such as program or function can be avoided.

Illustratively, in practical applications, the strain monitoring system (surrounding rock deformation monitoring system) has the following overall structural composition:

The monitoring system can be divided into two parts: software system and hardware system. The hardware system mainly includes strain optical cable, communication transmission optical cable, anchors and other equipment, as well as multi-channel ultra-weak fiber grating demodulator.

The software system is the monitoring software for the surrounding rock loose zone installed on the ground monitoring port, which can read the wavelength values measured by the optical fiber demodulator for each strain optical cable and input them into the database, and can calculate the strain value of each measuring point through the set sensitivity.

Figure 3:
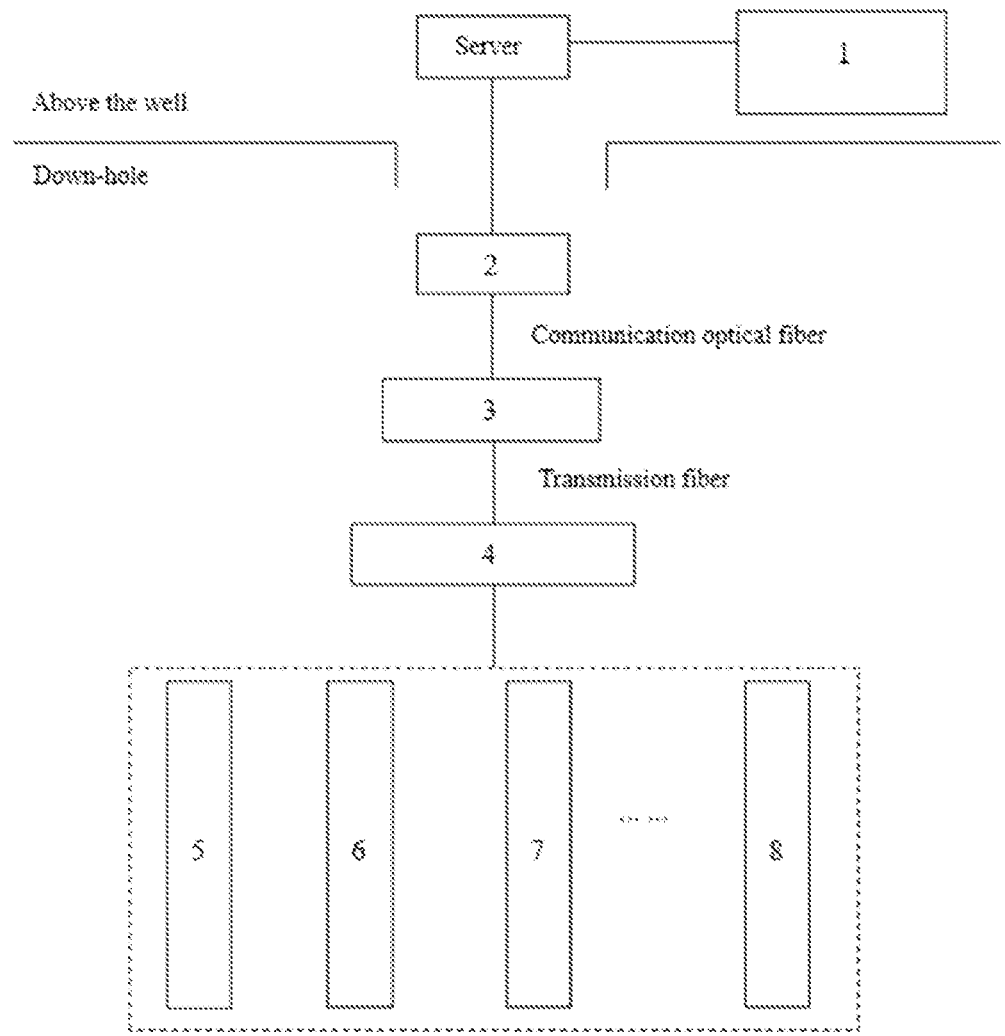
FIG. 3 is a schematic diagram of tan overall structure of a strain monitoring system of the present application.

A structure of the monitoring system can be designed according to different positions above and below the coal mine. The parts of down-hole sensing equipment mainly include optical fiber demodulator, optical fiber flange, optical fiber grating sensor of an optical cable type and so on. The monitoring part above the well mainly comprises a client monitoring computer, an area network server, etc. and the overall structural design is as shown in an overall structural schematic diagram of the strain monitoring system of the present application shown in FIG. 3.

In the application process, the monitoring system uses all-optical fiber transmission to connect the data collected down-hole with the monitoring room above the well. Based on weak fiber grating sensors, a number of FBG sensors are installed in the surrounding rock of different sections of the roadway by using the integrated idea. When the surrounding rock of the roadway is deformed, the grating pitch and reflectivity of the weak fiber grating sensors change in wavelength due to external interference.

After the sensor is connected to the high-capacity weak fiber grating demodulator, the wavelength change information is input into the demodulator and converted into recognizable electrical and digital signals. Through the local area network inside the coal mine, the converted signal will be transmitted to the data processing software of the monitoring room above the well, and the signal will be displayed as data and image after processing.

Illustratively, in practical applications, the strain monitoring system (surrounding rock deformation monitoring system) has the following hardware structure design:

The hardware part of the monitoring system is based on the weak optical fiber sensing technology, and makes full use of the linear relationship between wavelength change and strain perturbation of weak optical fiber gratings, and combines multiple weak optical fiber gratings into a quasi-distributed sensing network through time division multiplexing technology in series in the form of optical cable.

| Item | Index |
|---|---|
| Fiber type | G652. D single mode fiber |
| Core | Single-core weak grating sensing optical fiber |
| Grating point spacing | 1 m |

-continued

| Item | Index |
|---|---|
| Grating central wavelength | 1532 nm, single wavelength |
| Outer diameter of optical cable | 6 mm |
| Strain range | ≥3% |
| Strain sensitivity coefficient | 1.23 pm/με |
| Temperature sensitivity coefficient | 10.78 pm/° C. |
| Optical cable jumper joint | FC/APC |

The hardware of monitoring system mainly includes weak fiber grating sensor, fiber demodulator, DC voltage regulator, network relay, ethernet switch, fiber flange, transmission fiber and other structural components.

(1) Weak Reflection Fiber Bragg Grating Sensor

The optical fiber sensor used in the deep surrounding rock monitoring system is the weak reflection fiber Bragg grating sensor developed above, and the relevant parameters are shown in Table 6 below:

Table 6—Index Parameters of Weak Fiber Grating Optical Cable (2) Weak Fiber Bragg Grating Demodulator Weak fiber grating demodulator is mainly composed of fiber grating demodulation module, which is the core equipment of surrounding rock deformation monitoring system. The number of fiber grating sensor channels can be expanded by switching the light inside the module. According to the existing number of channels, the simultaneous demodulation of 8 strain optical cables in 8 channels can be realized.

Weak fiber grating demodulator can demodulate the central wavelength range of 1528 nm~1568 nm. The grating reflectivity of the demodulator is 0.001%~0.1%. The spatial resolution of the demodulator is 1 m according to the designed spacing of the optical fiber sensor, i.e. the minimum distance between two demodulable gratings is 1 m. When the distance is too small, the data will be lost.

(3) Network Relay

The network relay in the monitoring system is a regulating device connected between the fiber grating demodulator and the power supply. The upper interface end faces from left to right are an input power interface, a network cable interface and a reset key, respectively, while the lower interfaces are all output leads. The specific information of the keys and indicator lights of the network relay is shown in Table 7 below:

TABLE 7

Work instruction sheet for relay

| Key/indicator light | Identification | Function | Description |
|---|---|---|---|
| Net interface with red light | / | Network connection status indication | Light on when the physical connection of the network is normal, and the network cable is in good contact and is often bright |
| Net interface with green light | / | Data transceiving indication | Light on when the device transceives network data |
| Paster green light | Work | Operating state indication | Blinking at a rate of 1 per second during normal operation |
| Paster red light | IN_LED | Input interface IN status indication | Light on when there is a signal and light off when there is no signal |

TABLE 7-continued

Work instruction sheet for relay

| Key/indicator light | Identification | Function | Description |
|---|---|---|---|
| Paster red light | OUT_LED | Input interlace OUT status indication | Light on when closed and light off when disconnected |
| Self-resetting key | Reload | Restore to factory settings | Press tor 2 seconds to restore device parameters to factory default parameters |

(4) Dc Voltage Stabilizer

The DC regulator in the monitoring system is powered by DC 9~36V, its output voltage is 12V, the maximum power is up to 120 W, and it provides a stable power supply for the network relay, 8-channel weak grating demodulator and cooling fan.

Figure 4:
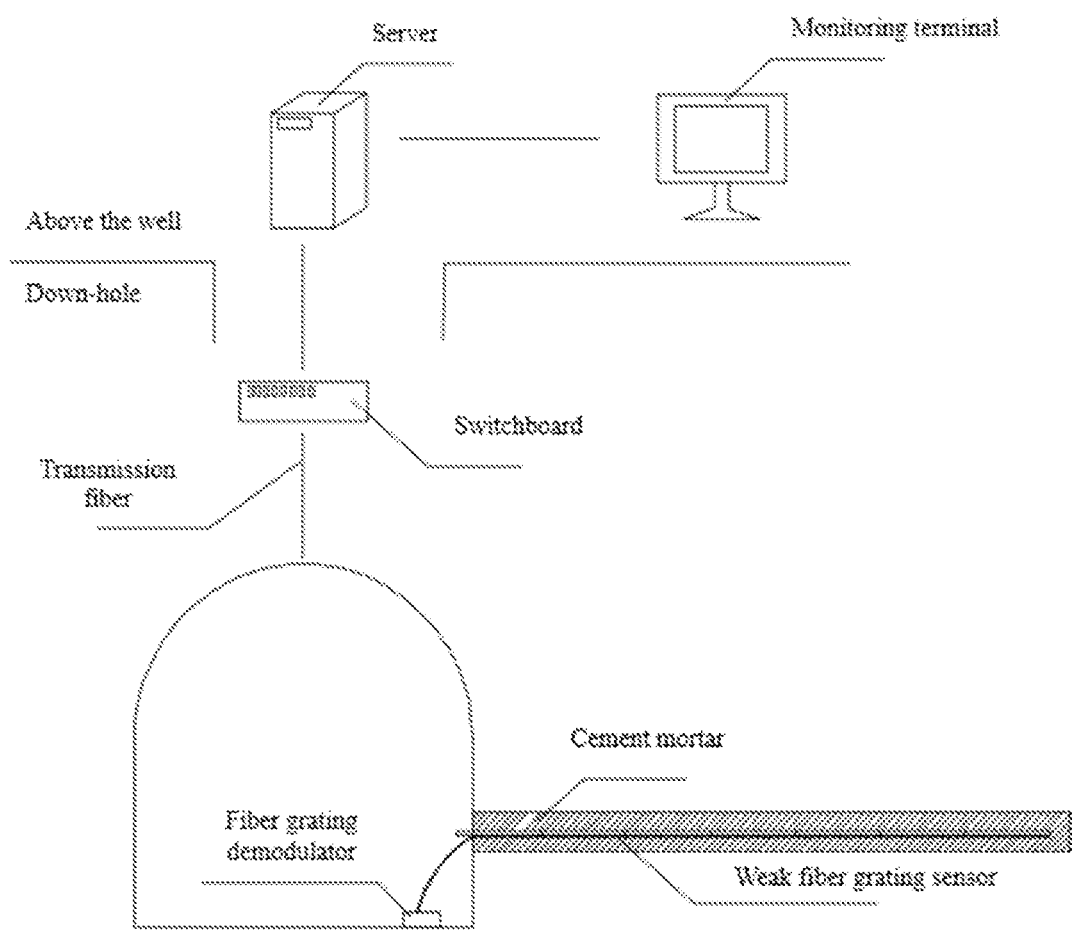
FIG. 4 is a schematic diagram of a hardware structure design of a strain monitoring system of the present application.

According to the above-mentioned various monitoring system hardware devices, in practical engineering applications, a plurality of sensor placement holes are first drilled in the selected surrounding rock of the roadway, and then the optical fiber grating sensor is pushed into the bottom of the hole and injected with cement mortar, so that the sensor and the surrounding rock of the roadway are coupled as a whole. The interface of the sensor is connected to a weak optical fibre grating demodulator, and finally to a monitoring platform above the well via a transmission optical fibre and a local area network to complete the on-site construction of a hardware system, and the schematic diagram of the structural design thereof is as shown in the schematic diagram of a hardware structural design of the strain monitoring system of the present application shown in FIG. 4.

Illustratively, in practical applications, the strain monitoring system (surrounding rock deformation monitoring system) has the following software design:

Monitoring System Software Architecture

Based on ultra-weak reflectivity fiber grating sensing technology, the coal mine surrounding rock roadway deformation monitoring software is written by using C# high-level programming language, using the open source C# Winform control library, tool class library, extended class library, multi-page development framework SunnyUI to complete the main functions. The development tool is Visual studio 2019 and the runtime support is Microsoft.NET Framework 4.8.

The surrounding rock roadway deformation monitoring software of a coal mine mainly consists of two parts: server and client:

(1) The server mainly undertakes the function of data and command transmission, and is connected to the down-hole monitoring end by means of local area network and transmission optical fiber, and obtains the wavelength monitoring data measured by the weak optical fiber grating and transmits same to the server through the Ethernet switch, and stores same in the software database.

(2) The client part is installed in the monitoring room above the well and can be used after configuration by simple program installation. The monitoring software client acquires the information of the optical fiber grating sensor through the demodulation equipment, analyzes the deformation of the coal mine roadway through the software demodulation analysis, and displays with the visual interface.

Based on the powerful information management capability of the database, using the database to manage the data information, the monitoring software and the database are installed on the same service or monitoring computer to carry out the real-time monitoring and data management of the coal mine roadway deformation.

Surrounding Rock Deformation Monitoring Software Function

Surrounding rock deformation monitoring software is based on weak reflectivity fiber grating sensing technology, and its design involves the integration of a variety of modules, including down-hole information input, reading, management, analysis and results output functions. Surrounding rock deformation monitoring system uses database to manage data information, and remotely accesses weak reflectivity fiber grating demodulation equipment through Ethernet or regional network to obtain sensor information in real time.

The monitoring software has the function of visual display of the deformation information of the coal mine roadway. The software obtains the sensor information to analyze the deformation situation of each section of the coal mine roadway in real time, and displays it in real time through the visual interface. The monitoring software has the function of historical data storage and query, can find historical raw data and strain information of coal mine roadway, can import and export historical data, and is convenient for data processing and storage.

The data input part mainly provides the basic data support for the surrounding rock monitoring software, which mainly comes from the field environmental data such as the surrounding rock parameters and drilling parameters input by relevant personnel at the initial stage of monitoring. The surrounding rock strain test data transmitted by the field-installed weak fiber grating sensor through the local area network and the pre-warning threshold set according to the relevant scientific research results. At the same time, it also needs to input the strain sensitivity measured by weak fiber grating sensor in calibration test, which is supported by parameters for subsequent data processing.

When the down-hole real-time monitoring data is transmitted to the monitoring platform above the well by transmission optical fiber, server and local area network, the data management module is used for preliminary integration. The monitoring database of this module will store the input monitoring wavelength data in time order, and provide data support for processing, monitoring and early warning functions of later monitoring software data. The test page in the module will directly display the raw data obtained by the weak fiber grating demodulator in down-hole monitoring.

Through the wavelength array diagram, it can clearly and intuitively observe whether the down-hole monitoring platform operates normally, and when the sensor fails, according to the corresponding grating position the specific number of the problem sensor can be determined, which is convenient to exclude the generated problem monitoring data.

After the database completes the storage of the monitoring data, the data processing module of the monitoring software can call the data therein by command, calculate the relevant wavelength data according to the sensitivity coefficient of the sensor which has been input, and obtain the strain data of the surrounding rock of the roadway.

A processing module built in the software can correspond the obtained strain data with the position of its grating, and generate a graph of the depth of surrounding rock of the roadway and the strain and displacement. In addition, the down-hole monitoring equipment continuously transmits data to the monitoring room above the well according to the set acquisition time interval, so the strain and displacement curves obtained by the data processing module can be updated in real time with the data.

The monitoring software can compare the deformation monitoring data with the preset alarm threshold after completing the processing of the down-hole monitoring data, trigger the early warning information when the monitoring data in a certain area is greater than the threshold for a certain time, and provide technical support according to the preset support solution.

Colloquially, the monitoring system of the present application has the following advantages (1) The surrounding rock deformation monitoring system combines hardware parts such as the weak optical fiber grating sensor and optical fiber grating demodulator with the surrounding rock deformation monitoring software to realize the real-time display and dynamic update of the strain and displacement values in the surrounding rock monitoring area of the down-hole roadway, and displays the real-time dynamic of the surrounding rock of the roadway through the data result curve intuitively and clearly, which demonstrates the real-time performance of the surrounding rock deformation monitoring system.

(2) The number, wavelength and distance from the surface of the surrounding rock of the roadway are displayed on the real-time monitoring-time monitoring graph through the positioning of the position coordinates of the grating, so that the monitoring personnel can quickly grasp the deformation of the surrounding rock of the roadway.

(3) The database of the software part of the monitoring system can store the monitoring wavelength data obtained by the down-hole optical fiber sensor, and classify and filter the data according to the data collection date, grating number, data change size and other labels. The on-site monitoring personnel can call corresponding data according to specific requirements, and process the selected data according to the self-contained analysis function of the software, so as to obtain the required monitoring curve and realize the deformation monitoring of key areas.

(4) The early warning function of the monitoring system is to judge whether there is a need to early warning the surrounding rock of the roadway by comparing the calculated strain data with the threshold value, and to judge the situation of large deformation range and the problematic grating point, so as to facilitate the inspection of the monitoring system and the maintenance of the surrounding rock of the deep roadway.

(5) The optical fiber monitoring data can be collected and collected by the grating demodulator module in the hardware of the monitoring system and sent to the server program in time. Due to the battery is installed inside the demodulation module, the down-hole equipment of the surrounding rock deformation monitoring system can be effectively ensured to operate normally when the power failure or other abnormal conditions occur in the daily production and maintenance process, which greatly improves the reliability of the monitoring system.

Figure 5:
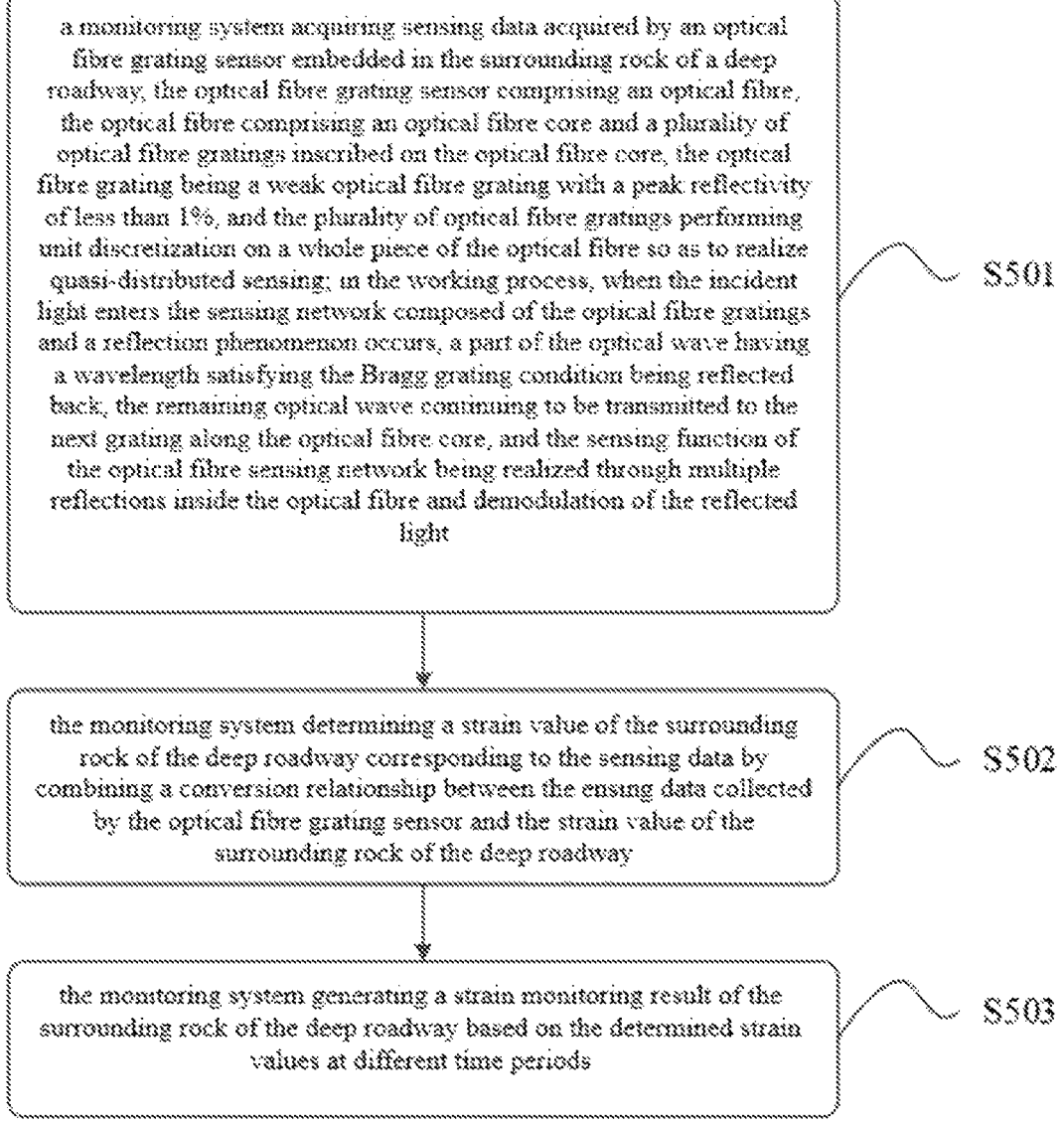
FIG. 5 is a schematic flow chart of a strain monitoring method for a surrounding rock of a deep roadway of the present application.

In order to further understand the above-mentioned work of the strain monitoring system for a surrounding rock of a deep roadway provided by the present application, it is also possible to continue to combine the strain monitoring method for a surrounding rock of a deep roadway provided by the present application on the basis of the system, with reference to a schematic flowchart of the strain monitoring method for a surrounding rock of a deep roadway of the present application shown in FIG. 5, and the strain monitoring method for a surrounding rock of a deep roadway provided by the present application may specifically comprise the following steps S501 to S503:

step S501, a monitoring system acquiring a first type of sensing data acquired by a first type of optical fibre grating sensor embedded in the surrounding rock of a deep roadway, the first type of optical fibre grating sensor comprising an optical fibre, the optical fibre comprising an optical fibre core and a plurality of optical fibre gratings inscribed on the optical fibre core, the optical fibre grating being a weak optical fibre grating with a peak reflectivity of less than 1%, and the plurality of optical fibre gratings performing unit discretization on a whole piece of the optical fibre so as to realize quasi-distributed sensing; in the working process, when the incident light enters the sensing network composed of the optical fibre gratings and a reflection phenomenon occurs, a part of the optical wave having a wavelength satisfying the Bragg grating condition being reflected back, the remaining optical wave continuing to be transmitted to the next grating along the optical fibre core, and the sensing function of the optical fibre sensing network being realized through multiple reflections inside the optical fibre and demodulation of the reflected light;

step S502, the monitoring system determining a strain value of the surrounding rock of the deep roadway corresponding to the first type of sensing data by combining a conversion relationship between the first type of sensing data collected by the first type of optical fibre grating sensor and the strain value of the surrounding rock of the deep roadway; and step S503, the monitoring system generating a strain monitoring result of the surrounding rock of the deep roadway based on the determined strain values at different time periods.

It can be understood that since the optical fiber grating sensor configured in the above-mentioned contents of the present application can accurately monitor the strain of the surrounding rock of the deep roadway, the strain monitoring system and method for the surrounding rock of the deep roadway provided by the present application can obtain a high-precision strain monitoring result of the surrounding rock of the deep roadway, and provide a strong data basis for the stability control of the surrounding rock.

The monitoring system determining a strain value of the surrounding rock of the deep roadway corresponding to the first type of sensing data by combining a conversion relationship between the first type of sensing data collected by the first type of optical fibre grating sensor and the strain value of the surrounding rock of the deep roadway may comprise that:

the monitoring system measures the strain value of the surrounding rock of the deep roadway according to the following formula:

$$\Delta\lambda_b = K_\varepsilon \varepsilon,$$

$\Delta\lambda_b$ being an increment value of a central wavelength $\lambda_b$, the central wavelength $\lambda_b$ being changed due to change of a refractive index $n_{eff}$ of the fibre core by the strain of the surrounding rock of the deep roadway, $K_\varepsilon$ being a strain sensitivity coefficient measured in advance by the optical fibre grating sensor, $\varepsilon$ being an optical fibre strain value, and $\varepsilon$ being taken as the strain value of the surrounding rock of the deep roadway.

It can be understood that the specific arrangement of the strain monitoring method for the surrounding rock of a deep roadway provided in the present application in practical applications (including the temperature monitoring of the surrounding rock) can also refer to the contents of the optical fibre grating sensor and the strain monitoring system for the surrounding rock of a deep roadway, and the detailed description thereof will not be repeated here.

In addition, with regard to the strain monitoring system for the surrounding rock of a deep roadway and the method thereof provided in the present application, in practical applications, on the basis of the strain condition of the surrounding rock collected by the optical fibre grating sensor and/or the strain monitoring condition obtained by processing, more accurate analysis and even intervention processing can also be performed.

Specifically, in a specific implementation, the specific deformation range where the surrounding rock of the deep roadway is located can be analyzed.

That is, after the monitoring system generates a strain monitoring result of the surrounding rock of the deep roadway based on the determined strain values at different time periods, the method further comprises:

the monitoring system determining a target roadway surrounding rock deformation range corresponding to the strain value according to a matching relationship between a pre-set strain value and a roadway surrounding rock deformation range, the roadway surrounding rock deformation range comprising three ranges in total, namely, an elastic region, a damage expansion region and a fracture expansion region.

In this way, on the basis of the strain monitoring effect of the foundation, the deformation range of the surrounding rock of a deep roadway in the deformation process can be reflected more accurately.

In addition, on the basis of the determined deformation range, the present application can further determine the intervention treatment for the surrounding rock of the deep roadway, and the intervention treatment can be understood as a secondary reinforcement treatment for improving the stability of the surrounding rock of the deep roadway.

Specifically, in practical applications, when the target roadway surrounding rock deformation range is a fracture expansion region, the monitoring system determines a reinforcement solution for a secondary support intervention according to development of the fracture expansion region, the reinforcement solution comprising the following contents:

the range of fracture expansion region <1 m, corresponding to stable surrounding rock, maintaining the original support structure, without secondary support;

the range of fracture expansion region being 1 m-2 m, corresponding to relatively stable surrounding rock, applying pre-stressed anchor rod support;

the range of the fracture expansion region being 2 m-3 m, corresponding to general stable surrounding rock, applying pre-stressed anchor rod support and shallow hole grouting;

the range of the fracture expansion region being 3 m-4 m, corresponding to general unstable surrounding rock, applying pre-stressed anchor rod support, anchor cable support and deep hole grouting;

the range of the fracture expansion region ≥4 m, corresponding to unstable surrounding rock, applying pre-stressed anchor rod support, anchor cable support, deep hole grouting and shed support.

It needs to be additionally stated that if the range of the fracture expansion zone is ≥4 m, since the instability thereof is very high, in order to achieve the purpose of accurate monitoring and avoiding unnecessary maintenance due to measurement error, before applying the pre-stressed anchor rod, anchor cable support, deep hole grouting and shed support, the present application also comprises a process of performing secondary verification on the data in the range, that is to say:

acquiring second type of sensing data acquired by a second type of optical fibre grating sensor embedded in the surrounding rock of a deep roadway, the second type of optical fibre grating sensor comprising an optical fibre, the optical fibre comprising an optical fibre core and a plurality of optical fibre gratings inscribed on the optical fibre core, the optical fibre grating being a weak optical fibre grating with a peak reflectivity lower than 1%, and the plurality of optical fibre gratings performing unit discretization on the whole piece of the optical fibre so as to realize quasi-distributed sensing; in the working process, when the incident light enters the sensing network composed of the optical fibre gratings and a reflection phenomenon occurs, a part of the optical wave having a wavelength satisfying the Bragg grating condition being reflected back, and the remaining optical wave continuing to be transmitted to the next grating along the optical fibre core, and the sensing function of the optical fibre sensing network being realized through multiple reflections inside the optical fibre and demodulation of the reflected light;

the monitoring system performing secondary verification on the target roadway surrounding rock with the deformation range being the fracture expansion region according to the second type of sensing data;

if verified range of the fracture expansion region after the second verification ≥4 m, applying the pre-stressed anchor rod support, anchor cable support, deep hole grouting and shed support;

if the verified range of the fracture expansion region after the second inspection is 3 m-4 m, obtaining a standard range of the fracture expansion region according to the range of the fracture expansion region and the verified range of the fracture expansion region, the standard range of the fracture expansion region being obtained by taking an average value from the sum of the range of the fracture expansion region and the verified range of the fracture expansion region; when the standard range of fracture expansion region is 3 m-4 m, then applying the pre-stressed anchor rod support, anchor cable support and deep hole grouting; when the standard range of the fracture expansion region ≥4 m, applying the pre-stressed anchor rod support, anchor cable support, deep hole grouting and shed support.

A person skilled in the art would have been able to understand that the first type of optical fibre grating sensor and the second type of optical fibre grating sensor in the present application are optical fibre grating sensors of the same structure, and the second type of optical fibre grating sensor, as a test sensor, can enable monitoring when it is required to perform a secondary test on the sensing data. In this process, the data detected by the first type of optical fibre grating sensor is the first type of sensing data, and the data detected by the second type of optical fibre grating sensor is the second type of sensing data.

Furthermore, due to the uncertainty of the surrounding rock evolution, in order to avoid that the current support solution determined only according to the scope of the fractured and expanded region cannot meet the current actual evolution maintenance requirements due to the excessive evolution speed of the surrounding rock, based on this application, the stability coefficient of the surrounding rock is introduced, and the support solution of the surrounding rock is supplemented and protected according to the difference value of the stability coefficient of the target roadway surrounding rock at the previous moment and the current moment. Specifically, it includes:

the stability coefficient V1 corresponding to the stable surrounding rock being marked as 1.0 when the range of fracture expansion region <1 m; the stability coefficient V2 corresponding to the relatively stable surrounding rock being marked as 2.0 when the range of fracture expansion region is 1 m-2 m; the stability coefficient V3 corresponding to the general stable surrounding rock being marked as 3.0 when the range of fracture expansion region is 2 m-3 m; the stability coefficient V4 corresponding to the general unstable surrounding rock being marked as 4.0 when the range of fracture expansion region is 3 m-4 m, and the stability coefficient V5 corresponding to unstable surrounding rock being marked as 5.0 when the range of fracture expansion region ≥4 m;

acquiring a difference value of the stability coefficient of the target roadway surrounding rock at the previous moment and the current moment, the V being equal to $V_{current}$ minus $V_{previous}$, and the $V_{previous}$ and/or $V_{current}$ being any numerical value of the V1, V2, V3, V4 and V5;

if V is less than or equal to 0, determining to be a safety zone, and maintaining the original support structure, with no secondary support;

if V is equal to 1, determining to be a normal evolution region, and performing a reinforcement solution according to a current range of the fracture expansion region; and if V is greater than or equal to 2, determining to be an abnormal evolution region, and performing a reinforcement solution according to the range of the fracture expansion region ≥4 m.

That is to say, when the difference value of the stability coefficient of the surrounding rock of the target laneway at the last moment and the current moment is less than or equal to 0, it can be understood that the evolution process of the surrounding rock of the target laneway has hardly changed, and at this moment, in order not to increase the additional support cost investment, the original support structure can be maintained without secondary support. If the difference V between the stability coefficients of the target roadway surrounding rock at the previous moment and the current moment is greater than or equal to 3, it indicates that the evolution speed of the target surrounding rock is very fast, and it can be determined as an abnormal evolution area, for example, the range of the fracture expansion region of the surrounding rock at the previous moment is less than 1 m, while the range of the fracture expansion region of the surrounding rock at the current moment is 2 m-3 m, and if the supporting action is performed according to the supporting solution with the range of the fracture expansion region of the surrounding rock at the current moment, it is very likely that the instability brought by the evolution speed of the surrounding rock at the next moment is greater than the supporting effect of the supporting solution selected at the current moment. Therefore, in order to avoid this situation, the reinforcement solution is directly implemented for the target roadway surrounding rock in the abnormal evolution area according to the range of ≥4 m of the fracture expansion region.

It can be seen that, under the above-mentioned arrangement, the present application takes the development condition of the fracture expansion region as the basis for the support intervention, so as to realize the support accurate intervention of the surrounding rock of the deep roadway, and thus can realize the accurate and effective stability control of the surrounding rock of the deep in actual operation.

In particular, the foregoing may be more thoroughly understood in conjunction with the following.

1. Division of Deformation Region of Surrounding Rock in Deep Roadway

In order to obtain a more practical result, the experimental data collected here are all from the compression experiments of rock samples collected from Huainan mining area. Based on the compression experimental data of rock samples with different lithology, the stress-strain curves in the compression process are studied, and the strain values of rock samples with different lithology in the elastic stage, plastic stage and fracture stage in the compression process are counted.

1) Summary and Analysis of Uniaxial Compression Test Results of Rocks (1) Fine Sandstone When the rock sample reaches the strain value of 4%~4.5% (a range threshold value, combined with the range of the sensor, the specific strain value threshold value can be calculated, and the following content is also the same) in the uniaxial compression process, the rock sample turns from elastic deformation to plastic deformation, and fracture occurs when it reaches about 5%.

Therefore, in the roadway with fine sandstone as main, the strain value of 4% is used as the division basis of elastic zone and damage expanding zone in surrounding rock deformation, and the strain value of 5% is used as the division basis of damage expanding zone and fracture expansion zone.

(2) Sandy Mudstone

When the strain reaches about 4%, the rock samples change from elastic deformation to plastic deformation, and fracture occurs when the strain reaches 5%-6%. Therefore, in the roadway with sandy mudstone as main, the strain value of 4% is used as the division basis of elastic zone and damage expanding zone in surrounding rock deformation, and the strain value of 5% is used as the division basis of damage expanding zone and fracture expansion zone in surrounding rock deformation.

(3) Mudstone

When the strain reaches 2.5%-3% in uniaxial compression, the rock samples change from elastic deformation to plastic deformation, and fracture occurs when the strain reaches 3%-3.5%. Therefore, in the mudstone roadway, the strain value of 2.5% is used as the division basis of elastic zone and damage expanding zone in surrounding rock deformation, and the strain value of 3% is used as the division basis of damage expanding zone and fracture expansion zone in surrounding rock deformation.

(4) Limestone

When the strain reaches about 4%, the rock samples change from elastic deformation to plastic deformation, and fracture occurs when the strain reaches about 5%.

Therefore, in the limestone roadway, the strain value of 4% is used as the division basis of elastic zone and damage expanding zone in surrounding rock deformation, and the strain value of 5% is used as the division basis of damage expanding zone and fracture expansion zone in surrounding rock deformation.

(5) Siltstone

When the strain reaches about 3.5%-4%, the rock sample changes from elastic deformation to plastic deformation in uniaxial compression occurs when the strain reaches about 4.5%.

Therefore, the strain value of 3.5% is taken as the division basis of the elastic zone and the damage expanding zone in the surrounding rock deformation, and the strain value of 4.5% is taken as the division basis of the damage expanding zone and the fracture expansion zone in the surrounding rock deformation.

2) Surrounding Rock Deformation Regional Division

According to the collected experimental data and the strain values obtained from the corresponding analysis, the surrounding rocks of the roadway with different lithologies are divided into regions, and the specific values are shown in Table 8 below:

TABLE 8

Classification of deformation area of surrounding rock

| Lithology | Strain | | |
|---|---|---|---|
| | Elastic zone | Damage expanding region | Fracture expansion region |
| Fine sandstone | ≤4‰ | 4‰~5‰ | ≥5‰ |
| Sandy mudstone | ≤4‰ | 4‰~5‰ | ≥5‰ |
| Mudstone | ≤2.5‰ | 2.5‰~3‰ | ≥3‰ |
| Limestone | ≤4‰ | 4‰~5‰ | ≥5‰ |
| Siltstone | ≤3.5‰ | 3.5‰~4.5‰ | ≥4.5‰ |

2. Stability Control of Surrounding Rock of Deep Roadway

1) Stability Control Theory of Surrounding Rock in Deep Roadway

The stability of surrounding rock mass is determined by the strength, mechanical properties and stress state of surrounding rock of deep roadway. The parameters such as compressive strength, deformation modulus and Poisson's ratio of confining pressure are affected by its stress state. Therefore, in order to control the stability of deep roadway, the strength and stress state of surrounding rock should be considered.

Before excavation of deep tunnel, the surrounding rock mass is subjected to high ground stress for a long time, and its compressive strength is much higher than the maximum deviatoric stress. The strength of rock under two-dimensional stress is lower than that under three-dimensional stress. As the confining pressure of rock increases, the maximum strength of rock under three-dimensional stress state will also increase.

Therefore, the stress state on the surface of the surrounding rock of the roadway will change after the deep roadway excavation, the stress will transfer to the periphery of the roadway, and the stress concentration phenomenon will occur, which will lead the surrounding rock of the roadway to develop into the interior rapidly after the excavation, and rapidly deteriorate and destroy in a certain range.

Therefore, in order to control the stability of the surrounding rock of the deep roadway, the stress state of the surrounding rock must be changed first. When only U-shaped steel and other passive support methods are used, the stress on the surrounding rock surface is less than the original rock stress of deep roadway, which cannot achieve stability control of roadway. Therefore, it is necessary to change the bond strength and internal friction angle of surrounding rock and control the stability of surrounding rock by strengthening the strength of surrounding rock.

At the same time, the high osmotic pressure drop caused by the excavation disturbance of deep roadway will increase the effective stress of surrounding rock on the roadway surface, accelerate the development of surrounding rock cracks from the outside and inside, which has a greater barrier to the stability control of surrounding rock. Therefore, in order to control the development of fracture, grouting is needed to close the fracture. The temperature stress on the surface of surrounding rock caused by the long-term temperature change of roadway causes the surrounding rock to be damaged continuously. Therefore, it is necessary to use high strength and high toughness grouting reinforcement materials to repair the damage caused by the development of surrounding rock cracks when the surrounding rock control means is implemented.

Through the analysis of the above-mentioned surrounding rock deformation, the present application introduces a surrounding rock of a deep roadway control theory and a distributed combined support concept here.

After the deep roadway excavation, the corresponding supporting measures should be taken to restore the surrounding rock on the roadway surface to the three-dimensional stress state under the two-dimensional stress state. From the angle of improving the strain state of the surrounding rock, the normal deformation of the surrounding rock is restricted to realize the stability control of the surrounding rock.

The stability of surrounding rock is controlled by using high strength support measures such as pre-stressed anchor and anchor cable to change the inherent properties of surrounding rock, such as internal friction angle of surrounding rock, and improve its own shear strength, so that the surrounding rock of the roadway under the action of high ground stress reduces the deformation along the fracture slip surface, and the stability of surrounding rock is controlled by improving its own strength.

The support measures of grouting for the surrounding rock in the fracture zone are controlled. By injecting cement slurry to close the gap, the surrounding rock repair in the damage expanding zone and the surrounding rock reinforcement in the fracture expansion zone are realized, and the overall strength of the surrounding rock in the roadway is restored. At the same time, the surrounding rock rupture damage area and the surrounding rock deep stable rock coupling as a whole, expanding the scope of surrounding rock of a deep roadway bearing ring.

According to the concept of distributed combined support, a variety of support measures can be used in combination with each other. In the practical application of roadway support, we should not only consider the effective control of surrounding rock stability, but also ensure the construction efficiency of deep roadway excavation and support. At the same time, in the specific support, corresponding support measures should be used in combination according to the type of surrounding rock of the roadway:

(1) For the stable surrounding rock, because of its good integrity, there is almost no falling small pieces, and thus no support measures are taken.

(2) In order to control the stability of the surrounding rock, it is necessary to adopt corresponding supporting means to restore the stress state of the surrounding rock and increase the strength of the surrounding rock.

(3) For general stable surrounding rock, other supporting methods should be used to consolidate the fracture region of the surrounding rock and restore the stress state.

(4) For the general unstable surrounding rock, it is necessary to optimize the roadway cross-section shape and realize stability control on the basis of restoring the stress state, increasing the surrounding rock strength and grouting restoration.

(5) For unstable surrounding rock, it is necessary to apply prestress to increase the improvement degree of stress state on the basis of general unstable surrounding rock control measures.

2) Deep Surrounding Rock Support Measures (1) Surrounding Rock Stress State Recovery Measures At present, after the excavation of the roadway, the surface stress is applied to the surface of the structure to the surrounding rock, and combined with grouting means, the surface stress is applied to the surface of the roadway surrounding rock, so as to change the stress state of the surrounding rock and achieve the stress state recovery of the surrounding rock.

(2) Surrounding Rock Reinforcement and Consolidation Repair Measures

After the deep roadway excavation, the strength of the surrounding rock itself and the external high stress is quite different, so the corresponding support measures should be taken to improve the strength of the surrounding rock. At present, the main support measures to achieve surrounding rock reinforcement are pre-stressed anchor and anchor cable, combined with high-strength and high-toughness cement mortar.

Bolts and cables are mainly used to limit the shear failure of the surrounding rock through the axial resistance of the structure. The shear strength of surrounding rock was improved by changing internal friction angle and bonding force. The surrounding rock is repaired by grouting to realize the consolidation and repair of the surrounding rock and improve its own strength.

The above-mentioned supporting measures should be combined according to the type of surrounding rock in practical engineering application. For the more stable surrounding rock, the anchor rod support is the main support measure, and the grouting can only repair the fractured surrounding rock on the surface because the deep crack has not expanded, which plays the role of reinforcement. For the general stable surrounding rock and unstable surrounding rock, the deep hole grouting support method is usually used to achieve the consolidation of surrounding rock in the fracture zone and improve the overall strength of surrounding rock.

(3) Controls for Stress Transfer

After the deep roadway excavation, the surrounding rock in the fracture zone usually needs corresponding supporting means to achieve stress transfer to control the stability of surrounding rock. The general treatment measures are the combination of high pre-stressed anchor, anchor cable and grouting of high strength and high toughness material. The anchor rod and anchor cable can effectively limit the shear deformation of the surrounding rock of the roadway, and control the extension range of the damage expansion region and the damage degree of the fracture expansion region.

By injecting high-strength and high-toughness grout, the expansion range of expansion zone and the degree of fracture expansion zone can be effectively controlled, and the surrounding rock can be repaired and consolidated by diffusion of grout. At the same time, the peak value of surrounding rock stress is transferred to the deep part of roadway surrounding rock, the range of surrounding rock bearing ground stress is expanded, the deformation of roadway is limited, and the stability control of roadway is realized.

3. Precise Support Intervention for the Surrounding Rock of a Deep Roadway

Based on the above-mentioned division method of surrounding rock deformation region, the types of surrounding rock are evaluated according to the development range of fracture expansion region, and they are divided into different grades of surrounding rock. In combination with the technical measures in the above aspects, different grades of surrounding rock are used in combination. The surrounding rock deformation monitoring system of the roadway is combined to complete the deformation monitoring of the surrounding rock of the deep roadway and the secondary support, the support method thereof being as shown in Table 9 below:

TABLE 9

Classification table for surrounding rock support of deep roadway

| Classification name | Range of fracture expansion region (m) | Support measure |
|---|---|---|
| Stable surrounding rock | <1 | Maintain original support structure without secondary support |
| Relatively stable surrounding rock | 1~2 | Pre-stressed anchor rod support |
| General stable surrounding rock | 2~3 | Pre-stressed anchor rod support and shallow hole grouting |
| General unstable surrounding rock | 3~4 | Pre-stressed anchor rod, anchor cable support, deep hole grouting |
| Unstable surrounding rock | ≥4 | Pre-stressed anchor rod, anchor cable support, deep hole grouting and shed support |

According to the above-mentioned contents and colloquially, the contents of the solution proposed by the present application for the accurate support and intervention of the surrounding rock of a deep roadway are as follows.

(1) For the stable surrounding rock, because of its good integrity, the secondary support is not needed, and the stability of surrounding rock can be maintained only by the primary support structure.

(2) For the relatively stable surrounding rock, the surrounding rock deformation is controlled by the anchor rod support structure. By changing the inherent properties of the surrounding rock, the shear failure of the surrounding rock is limited and its stress state is restored.

(3) For the general stable surrounding rock, the combined use of anchor rod support and grouting can restore the stress state, enhance the strength of surrounding rock and repair the surrounding rock cracks.

(4) In order to restore the stress state of surrounding rock, the genera unstable surrounding rock is supported by anchor rod and anchor cable, and the deep hole grouting method is used to repair and consolidate the fractured and expanded area of surrounding rock. At the same time, the upper deep hole grouting combined with pre-stressed anchor cable coupling will anchor area and deep surrounding rock, realize the transfer of stress peak value and control the stability of surrounding rock.

(5) For the unstable surrounding rock, it is also necessary to support the surrounding rock with the support measures of the general unstable surrounding rock, and implement the combination of active support and passive support. Passive stress is applied to the surrounding rock on the surface of the roadway through U-shaped steel support structure, and combined with anchor rod and anchor cable to form a combined support system, so as to further improve the stress state of the surrounding rock on the surface, and effective control of surrounding rock stability and construction safety.

Further, the above solution can also be understood in conjunction with the following set of examples.
a) Generalization on Field Application of Monitoring System The belt conveyor roadway on the south wing of Guqiao Coal Mine is the coal outlet passage from the south area to the central area and the throat of the coal outlet system in the south area. The tunnel passes through the geological anomaly, the fault zone develops, the surrounding rock is broken, and the construction conditions are extremely complex. After the main lane (II) of the south-wing belt conveyor has been connected and put into use, no lane repair has been carried out, and now there have been different degrees of deformation. In order to ensure the safety and reliability of the system and the post-evaluation of roadway support under complex geological conditions, necessary research and investigation should be carried out.

In order to avoid the influence of geological anomalies and fault fracture zone, the "V"-shaped bypass connection is adopted in the main lane of south-wing belt conveyor to avoid the influence of geological anomaly and fault fracture zone, which results in the overlapping of multiple belts, multiple links, complex system, long transportation route and increase of uncertain factors in the coal output system. If the large lane of the south wing belt conveyor is straightly connected, it cannot only shorten the coal production line and simplify the coal production link, but also create the conditions for straightly connecting the large lane of the south wing track and prepare for the second horizontal extension of the south area.

Based on the above reasons, this paper takes the south-wing track roadway of Guqiao as the site industrial test site, installs the weak fiber grating sensor, fiber grating demodulation module demodulation module, network relay and other monitoring system hardware equipment in the south-wing track roadway, collects the strain data of the surrounding rock of the roadway, forms the surrounding rock deformation monitoring system by combining the monitoring software above the well, and realizes the real-time monitoring of the surrounding rock deformation of the deep roadway.

According to the comparison between the real-time monitoring of surrounding rock and the field actual situation, the application of surrounding rock deformation monitoring system in practical engineering is investigated. At the same time, the surrounding rock deformation area is divided according to the monitoring data of surrounding rock deformation, and when the bursting area develops to the pre-warning threshold range, the corresponding support method is implemented to achieve the stability control of surrounding rock in deep roadway.

2. Geological Profilemine

Guqiao Coal Mine belongs to Huainan Mining Group, located in the northwest of Fengtai County, Anhui Province, with geographical coordinates of 116°26'15"-116°37'00" east longitude, 32°43'47"-32°52'30" north latitude, 7-15 km east-west width, 8-17 km north-south length and about 140 $km^2$ area. The overall structural morphology of the minefield is a monoclinic structure trending north-south and eastward, the stratigraphic slope is gentle, the dip angle is 5-150°, and the secondary broad and gentle folds and faults are uneven.

(2) Geological Conditions of Working Face

Guqiao south wing track roadway is located between Guqiao south wing mining area and central mining area, the roadway construction orientation is 178°, the coal uncovering section is constructed by 3% elevation angle, the design roadway is 4200 m in total length, the floor design elevation is −779.3 m~−796.0 m.

The geological structure of the driving section of the south-wing track roadway is very complex, passing through the fracture zone of dense fault zone composed of several main faults such as FD108-1, FD108-b, FD108, FD108-a and their secondary faults. Affected by the faults, the small structural fractures develop and the rock mass is abnormally fractured and weak. Among them, FD77 has normal fault strike 245°, dip 155°, dip 80°; FD76 has normal fault strike 265°, dip 175°, dip 80°.

3. Field Installation of Monitoring System (1) Monitoring System Test Site Selection Due to the complex geological conditions of deep coal mine roadway, the roadway surrounding rock deformation monitoring system cannot realize the distributed monitoring of the whole roadway. Therefore, reasonable selection of representative stations can effectively improve the accuracy of surrounding rock monitoring results, and the monitoring results can truly reflect the strain of surrounding rock of a deep roadway. Therefore, in order to ensure the accuracy and reliability of surrounding rock monitoring results, the selection of site testing sites is representative, which can reflect the deformation of surrounding rock in the testing area.

At the same time, the selection of testing site should consider the convenient connection of surrounding rock deformation monitoring system, make overall consideration of the convenient arrangement of optical fiber grating sensors, transmission cables and other cables as well as the reasonable arrangement of optical fiber demodulator, minimize the use of optical fiber flanges, etc, and avoid energy loss. The water and electricity near the testing site need to be complete, the cross-sectional area selected at the testing site is large enough to ensure that the drilling work of the drilling machine has enough implementation space.

According to the above-mentioned requirements for selecting test sites, the present application selects two sites for monitoring the deformation of the surrounding rock of the roadway.

(2) Monitoring System Hardware Arrangement

1) Arrangement of Fiber Grating Sensor

After the location of the testing site is selected, the installation position of the fiber grating sensor is designed. According to the requirements of feasibility and convenience of tunnel construction on site, in order to understand the deformation of section surrounding rock as much as possible, it is designed to drill at the top, shoulder and side of the tunnel and install the fiber grating sensor conveniently. A total of 6 fiber grating sensors were installed in two roadway sections.

2) Setting of Down-Hole Monitoring Base Station

In the design of the surrounding rock deformation monitoring program, it is necessary to monitor the strain of two roadway sections for a long time, and access the mine local area network through the down-hole Ethernet switch and network information transmission fiber to achieve real-time monitoring on the well. Therefore, the fiber grating demodulator is installed between the two sections in a relatively dry position, which is used as a down-hole monitoring base station to collect and transmit the surrounding rock deformation data.

3) Optical Cable Line Design

The length and core number of optical fiber transmission cable are designed according to the given monitoring solution, the selection of measuring point section, the layout position of monitoring base station and the number of monitoring instruments. Considering the distance from the monitoring base station, the distance from the monitoring base station to the Ethernet switch, the convenience of the sensor construction and the weight of the optical cable, the transmission loss of the transmission optical cable and the connection loss of the flange interface, the section of the optical cable connection is designed.

The first segment connected from the demodulation equipment of the down-hole monitoring base station to the measuring point of the south wing belt conveyor lane (2) is three optical cables with one core, and 400 m is laid through the flat cable, while the measuring point of the south wing roadway has a linear distance of 1200 m from the monitoring base station, and a second segment of optical cables is laid, wherein the second segment of optical cables is one cable with three cores, and the optical cables at two ends are connected according to the optical cores with the same label through the optical fiber junction box.

(3) Monitoring System Installation and Process

1) Monitoring system check before installation: before the installation of roadway surrounding rock deformation system, it is necessary to inspect the appearance and working state of the instruments and devices used for monitoring. The inspection mainly includes whether the signal output of the optical fiber grating sensor is normal, whether the sealing property of the optical fiber grating sensor is intact, whether the number of bars required for the installation and positioning device of the optical fiber grating sensor is sufficient and whether the connection is firm, and whether the display and reading of the optical fiber grating demodulator are normal.

2) Surrounding Rock Drilling: geological drilling machine and pneumatic coal drilling are selected for drilling, and φ93 mm is selected for drill bit specification. After drilling to the design depth, clean the hole for debris and ensure that there is substantially no water accumulation in the hole.

3) Fiber optic sensor installation: firstly, the fiber grating sensor is connected with the matching fixed component and put into the hole. Then the optical fibre grating sensor is successively pushed to a design hole depth using a determined number of pushing assemblies, and the actual hole depth of the optical fibre grating sensor is recorded. Finally, a hole sealing device for grouting is successively passed through. The jumper end of each port is vented and connected to a weak fiber grating demodulator via a transmission fiber.

4) Drilling grouting backfill: the grouting material is a quick-setting cement slurry with expansibility. After the sensor is installed in place, the grouting pump must be used to seal the hole and fill the hole. The grouting slurry ratio should be strictly in accordance with the design requirements, and the pressure should be controlled at 1 MPa. The grouting process uses a pocket to seal the hole, and the grouting is finished after the slurry flows out from the reverse slurry pipe.

5) Strain monitoring: after the optical fiber grating strain sensor is successfully installed in the surrounding rock of the roadway, it is connected to the down-hole optical fiber demodulator through the transmission optical cable, and the corresponding time is recorded. In the later stage, through the corresponding data transmission means, the monitoring terminal is accessed to realize the real-time monitoring of roadway surrounding rock strain.

In addition, in the installation process of monitoring system, it is necessary to pay attention to make borehole inspection before measurement, detect the diameter shrinkage, oversize and hole wall caving section, and determine the final hole depth. After the drilling is completed, water needs to be injected into the test hole to flush out the residue in the hole, so as to facilitate the installation of the sensor. The raw materials used for grouting shall meet the quality specification, and the stirring time shall not be less than 5 min;

4. Monitoring Results and Analysis

After Guqiao south wing belt conveyor and track roadway fiber grating sensors, fiber grating demodulator and other equipment are successfully installed and commissioned, deformation monitoring for the surrounding rock of a deep roadway began. Through the down-hole direct connection equipment and down-hole software control methods, wavelength data of the fiber grating sensors in the surrounding rock are periodically derived, collated and analyzed, and results and conclusions of surrounding rock deformation monitoring by the two stations of the south wing roadway in three months are summarized.

South Wing Belt Conveyor

During the monitoring, the strain value within 3 m from the orifice is relatively large and reaches the strain peak at the orifice. The strain decreased with the change of hole depth in the range of 1~8 m, and changed more sharply in the range of 1~4 m:

The strain values of the orifice and the measuring points of 1, 2 and 5 m continuously increase with time, and the strain growth rate of the measuring point of 5 m hole depth slows down at 40d and then tends to stabilize.

During the monitoring, the strain value within 2 m from the orifice is relatively large and reaches the strain peak at the orifice. The strain decreased with the change of hole depth in the range of 1~7 m, and changed more sharply in the range of 1~3 m. The strain values of the measuring points outside the hole depth of 7 m are small and stable;

The strain values of the orifice and the measuring points of 1, 2 and 5 m increase with time, and the strain growth rate gradually slows down after 80d. The strain values at the measuring points 10, 15 m away from the orifice are basically unchanged.

During monitoring, the strain value within 2 m from the orifice is relatively large and reaches the strain peak at the orifice. The strain decreased with the change of hole depth in the range of 1~5 m, and changed more sharply in the range of 1~2 m. The strain values at the measuring points beyond 5 m of hole depth are small and stable.

The strain values of orifice and measuring points of 1, 2 and 5 m continuously increase with time. The strain values at the measuring points 10, 15 m away from the orifice are basically unchanged.

South Wing Track Survey Station

During monitoring, the strain value in 3 m from the orifice w relatively large, reaching the strain peak at 1 m. The strain values in the range of 1-5 m hole depth decrease with the change of hole depth, and change more sharply in the range of 1-4 m. The strain values at the measuring points beyond 5 m of hole depth are small and stable.

The strain values at the orifice and the measuring points of 1 m and 2 m increase with time, the strain values at the orifice tend to be stable after 40d, and the strain growth rate at the measuring point of 1 m decreases with time. The strain values at the measuring points 10, 15 m away from the orifice are basically unchanged.

During monitoring, the strain value in 3 m from the orifice is relatively large and reaches the strain peak at 1 m. The strain decrease with the change of hole depth in the range of 1~3 m, and change more sharply in the range of 1~2 m. The strain values of the measuring points outside the hole depth of 3 m are small and stable.

The strain values of the orifice and the measuring points of 1, 2 m continuously increase with time. The strain values at the measuring points 10, 15 m away from the orifice are basically unchanged.

During monitoring, the strain value in 7 m from the orifice is relatively large and reaches the strain peak at the orifice. The strain decrease with the change of hole depth in the range of 1~8 m, and change more sharply in the range of 1~2 m. The strain values at the measuring points beyond the hole depth of 10 m are small and stable.

The strain values of the orifice and the measuring points of 1, 2 m continuously increase with time. The strain values at the measuring points 10, 15 m away from the orifice are basically unchanged.

5. Roadway Surrounding Rock Support Intervention

According to the monitoring data of the south wing belt conveyor roadway and the track roadway, the surrounding rock deformation of the two stations can be obtained. In the large lane station of south wing belt conveyor, the maximum strain of the measuring points of wall rock side, roof and shoulder are 87.89με, 440.18με and 401.51με, respectively. Because the surrounding rock of the roadway is mainly sandy mudstone, by comparing with Table 9, the monitoring data of the surrounding rock of the station does not meet the strain range requirements of the fracture expansion zone in the deformation zone of the surrounding rock of the roadway. Therefore, for the surrounding rock of the large roadway of the south wing belt conveyor, the original support structure is maintained and no secondary support is performed.

In the south wing track station, the maximum strain of the wall rock side and shoulder are 1701.24με and 110.214με, respectively. By comparing with Table 9, the wall rock monitoring data of this section does not meet the strain range requirements of the fracture expansion zone in the deformation zone of the wall rock. The maximum strain at the top of the surrounding rock is 5231.55με, which reaches the strain standard of 5% in the fracture expansion zone, but the development range of the bursting zone is less than 1 m, so the surrounding rock of the station is stable.

Therefore, for the surrounding rock of the south-wing track station, the original support structure is maintained without secondary support. At the same time, the top of the surrounding rock is mainly monitored, when the development range of the surrounding rock fracture expansion region reaches 1 m, the pre-stressed anchor rod support is immediately implemented, and the corresponding stability control measures are determined according to the monitoring data of the surrounding rock deformation after support.

It will be appreciated by one of ordinary skill in the art that all or a portion of the steps in the methods set forth in the above embodiments may be performed by instructions, or by instructions controlling associated hardware, which may be stored in a computer-readable storage medium and loaded and executed by a processor.

To this end, the present application provides a computer-readable storage medium, in which a plurality of instructions are stored, and the instructions can be loaded by a processor so as to execute the steps of the strain monitoring method for a surrounding rock of a deep roadway in the present application, such as the corresponding embodiment of FIG. 5. For the specific operations, reference can be made to the description of the strain monitoring system for a surrounding rock of a deep roadway in the present application, and the description thereof will not be repeated here.

The computer-readable storage medium may comprise: read Only Memory memory, random access memory, magnetic or optical disk, etc.

Since the instructions stored in the computer readable storage medium can execute the steps of the strain monitoring method for the surrounding rock of a deep roadway in the embodiment of the present application corresponding to FIG. 5, the beneficial effects which can be achieved by the strain monitoring system for the surrounding rock of a deep roadway in the present application can be achieved. See the above description for details, and the description thereof will not be repeated here.

The strain monitoring system, method and computer-readable storage medium for a surrounding rock of a deep roadway of an optical fibre grating sensor provided in the present application are described in detail above, and the principles and embodiments of the present application are explained in this paper by using specific examples. The description of the above examples is only used to help understand the method and the core idea of the present application. At the same time, for a person skilled in the art, according to the idea of the present application, there would be changes in the specific embodiments and the application scope, and in summary, the contents of the present description should not be construed as limiting the present application.

What is claimed is:

1. A strain monitoring method for a surrounding rock of a deep roadway, comprising:
a monitoring system acquiring a first type of sensing data acquired by a first type of optical fibre grating sensor embedded in the surrounding rock of a deep roadway, the first type of optical fibre grating sensor comprising an optical fibre, the optical fibre comprising an optical fibre core and a plurality of optical fibre gratings inscribed on the optical fibre core, the optical fibre grating being a weak optical fibre grating with a peak reflectivity of less than 1%, and the plurality of optical fibre gratings performing unit discretization on a whole piece of the optical fibre so as to realize quasi-distributed sensing; in the working process, when the incident light enters the sensing network composed of the optical fibre gratings and a reflection phenomenon occurs, a part of the optical wave having a wavelength satisfying the Bragg grating condition being reflected back, the remaining optical wave continuing to be transmitted to the next grating along the optical fibre core, and the sensing function of the optical fibre sensing network being realized through multiple reflections inside the optical fibre and demodulation of the reflected light;
the monitoring system determining a strain value of the surrounding rock of the deep roadway corresponding to the first type of sensing data by combining a conversion relationship between the first type of sensing data collected by the first type of optical fibre grating sensor and the strain value of the surrounding rock of the deep roadway;
the monitoring system generating a strain monitoring result of the surrounding rock of the deep roadway based on the determined strain values at different time periods;
the monitoring system determining a strain value of the surrounding rock of the deep roadway corresponding to the first type of sensing data by combining a conversion relationship between the first type of sensing data collected by the first type of optical fibre grating sensor and the strain value of the surrounding rock of the deep roadway comprising: the monitoring system measuring the strain value of the surrounding rock of the deep roadway according to the following formula: $\Delta\lambda_b = K_\varepsilon \varepsilon$, $\Delta\lambda_b$ being an increment value of a central wavelength $\lambda_b$, the central wavelength $\lambda_b$ being changed due to change of a refractive index $n_{eff}$ of the fibre core by the strain of the surrounding rock of the deep roadway, $K_\varepsilon$ being a strain sensitivity coefficient measured in advance by the optical fibre grating sensor, $\varepsilon$ being an optical fibre strain value, and $\varepsilon$ being taken as the strain value of the surrounding rock of the deep roadway;
after the monitoring system generates a strain monitoring result of the surrounding rock of the deep roadway based on the determined strain values at different time periods, the method further comprising: the monitoring system determining a target roadway surrounding rock deformation range corresponding to the strain value according to a matching relationship between a pre-set strain value and a roadway surrounding rock deformation range, the roadway surrounding rock deformation range comprising three ranges in total, namely, an elastic region, a damage expansion region and a fracture expansion region;
after the monitoring system determining a target roadway surrounding rock deformation range corresponding to the strain value according to a matching relationship between a pre-set strain value and a roadway surrounding rock deformation range, the method further comprising: when the target roadway surrounding rock deformation range is a fracture expansion region, the monitoring system determines a reinforcement solution for a secondary support intervention according to development of the fracture expansion region, the reinforcement solution comprising the following contents: the range of fracture expansion region <1 m, corresponding to stable surrounding rock, maintaining the original support structure, without secondary support; the range of fracture expansion region being 1 m-2 m, corresponding to relatively stable surrounding rock, applying pre-stressed anchor rod support; the range of the fracture expansion region being 2 m-3 m, corresponding to general stable surrounding rock, applying pre-stressed anchor rod support and shallow hole grouting; the range of the fracture expansion region being 3 m-4 m, corresponding to general unstable surrounding rock, applying pre-stressed anchor rod support, anchor cable support and deep hole grouting; the range of the fracture expansion region ≥4 m, corresponding to unstable surrounding rock, applying pre-stressed anchor rod support, anchor cable support, deep hole grouting and shed support;
if the range of the fracture expansion region ≥4 m, the method further comprising, before applying the pre-stressed anchor rod support, anchor cable support, deep hole grouting and shed support:
acquiring second type of sensing data acquired by a second type of optical fibre grating sensor embedded in the surrounding rock of a deep roadway, the second type of optical fibre grating sensor comprising an optical fibre, the optical fibre comprising an optical fibre core and a plurality of optical fibre gratings inscribed on the optical fibre core, the optical fibre grating being a weak optical fibre grating with a peak reflectivity lower than 1%, and the plurality of optical fibre gratings performing unit discretization on the whole piece of the optical fibre so as to realize quasi-distributed sensing; in the working process, when the incident light enters the sensing network composed of the optical fibre gratings and a reflection phenomenon occurs, a part of the optical wave having a wavelength satisfying the Bragg grating condition being reflected back, and the remaining optical wave continuing to be transmitted to the next grating along the optical fibre core, and the sensing function of the optical fibre sensing network being realized through multiple reflections inside the optical fibre and demodulation of the reflected light;

the monitoring system performing secondary verification on the target roadway surrounding rock with the deformation range being the fracture expansion region according to the second type of sensing data;

if verified range of the fracture expansion region after the second verification ≥4 m, applying the pre-stressed anchor rod support, anchor cable support, deep hole grouting and shed support;

if the verified range of the fracture expansion region after the second inspection is 3 m-4 m, obtaining a standard range of the fracture expansion region according to the range of the fracture expansion region and the verified range of the fracture expansion region, the standard range of the fracture expansion region being obtained by taking an average value from the sum of the range of the fracture expansion region and the verified range of the fracture expansion region; when the standard range of fracture expansion region is 3 m-4 m, then applying the pre-stressed anchor rod support, anchor cable support and deep hole grouting; when the standard range of the fracture expansion region ≥4 m, applying the pre-stressed anchor rod support, anchor cable support, deep hole grouting and shed support;

the stability coefficient V1 corresponding to the stable surrounding rock being marked as 1.0 when the range of fracture expansion region <1 m; the stability coefficient V2 corresponding to the relatively stable surrounding rock being marked as 2.0 when the range of fracture expansion region is 1 m-2 m; the stability coefficient V3 corresponding to the general stable surrounding rock being marked as 3.0 when the range of fracture expansion region is 2 m-3 m; the stability coefficient V4 corresponding to the general unstable surrounding rock being marked as 4.0 when the range of fracture expansion region is 3 m-4 m, and the stability coefficient V5 corresponding to unstable surrounding rock being marked as 5.0 when the range of fracture expansion region ≥4 m;

the method further comprising:

acquiring a difference value of the stability coefficient of the target roadway surrounding rock at the previous moment and the current moment, the V being equal to $V_{current}$ minus $V_{previous}$, and the $V_{previous}$ and/or $V_{current}$ being any numerical value of the V1, V2, V3, V4 and V5;

if V is less than or equal to 0, determining to be a safety zone, and maintaining the original support structure, with no secondary support;

if V is equal to 1, determining to be a normal evolution region, and performing a reinforcement solution according to a current range of the fracture expansion region; and if V is greater than or equal to 2, determining to be an abnormal evolution region, and performing a reinforcement solution according to the range of the fracture expansion region ≥4 m.

2. A strain monitoring system for a surrounding rock of a deep roadway comprising a fiber grating sensor for performing the method of claim 1.

* * * * *